US012786464B2

(12) United States Patent
Chiang et al.

(10) Patent No.: US 12,786,464 B2
(45) Date of Patent: Nov. 3, 2026

(54) METHOD AND APPARATUS OF NOVEL INTRA PREDICTION WITH COMBINATIONS OF REFERENCE LINES AND INTRA PREDICTION MODES IN VIDEO CODING SYSTEM

(71) Applicant: MEDIATEK INC., Hsinchu City (TW)

(72) Inventors: Man-Shu Chiang, Hsinchu City (TW); Chih-Wei Hsu, Hsinchu City (TW); Chia-Ming Tsai, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 68 days.

(21) Appl. No.: 18/997,286

(22) PCT Filed: Jul. 17, 2023

(86) PCT No.: PCT/CN2023/107686
§ 371 (c)(1),
(2) Date: Jan. 21, 2025

(87) PCT Pub. No.: WO2024/017187
PCT Pub. Date: Jan. 25, 2024

(65) Prior Publication Data

US 2026/0032281 A1 Jan. 29, 2026

Related U.S. Application Data

(60) Provisional application No. 63/369,093, filed on Jul. 22, 2022.

(51) Int. Cl.
*H04N 19/593* (2014.01)
*H04N 19/105* (2014.01)
*H04N 19/176* (2014.01)

(52) U.S. Cl.
CPC ......... *H04N 19/593* (2014.11); *H04N 19/105* (2014.11); *H04N 19/176* (2014.11)

(58) Field of Classification Search
CPC ... H04N 19/105; H04N 19/176; H04N 19/593
See application file for complete search history.

(56) References Cited

U.S. PATENT DOCUMENTS 11,758,152 B2 9/2023 Zhao
11,943,435 B2 3/2024 Zhao
(Continued)

FOREIGN PATENT DOCUMENTS

CN 111836056 A 10/2020
CN 111955007 A 11/2020
(Continued)

OTHER PUBLICATIONS

International Search Report and Written Opinion dated Oct. 12, 2023, issued in application No. PCT/CN2023/107686.

*Primary Examiner* — Jayanti K Patel
*Assistant Examiner* — Christopher Kingsbury Glover
(74) *Attorney, Agent, or Firm* — McClure, Qualey & Rodack, LLP

(57) ABSTRACT

A method and apparatus of video coding using joint prediction by combining an intra prediction mode with one or more reference lines. According to the method, a set of joint prediction candidates are determined where each joint prediction candidate corresponds to a combination of an intra prediction mode from a group of intra prediction mode candidates and one or more reference samples in one or more reference lines from a group of reference line candidates. A target joint prediction candidate is determined from the set of joint prediction candidates where said one or more reference samples are used for assisting determining the target joint prediction candidate. The current block is encoded or decoded by using one or more predictors comprising the target joint prediction candidate.

18 Claims, 9 Drawing Sheets

(56) References Cited

U.S. PATENT DOCUMENTS

| | | | | |
|---|---|---|---|---|
| 2019/0364273 | A1* | 11/2019 | Zhao | H04N 19/11 |
| 2021/0314562 | A1* | 10/2021 | Kang | H04N 19/593 |
| 2022/0038684 | A1* | 2/2022 | Urban | H04N 19/176 |
| 2022/0086447 | A1* | 3/2022 | Xu | H04N 19/70 |
| 2023/0209060 | A1* | 6/2023 | Chiang | H04N 19/132<br>375/240.02 |
| 2025/0310519 | A1* | 10/2025 | Chiang | H04N 19/196 |

FOREIGN PATENT DOCUMENTS

| | | | |
|---|---|---|---|
| CN | 112073720 | A | 12/2020 |
| CN | 112956192 | A | 6/2021 |

* cited by examiner

METHOD AND APPARATUS OF NOVEL INTRA PREDICTION WITH COMBINATIONS OF REFERENCE LINES AND INTRA PREDICTION MODES IN VIDEO CODING SYSTEM

CROSS REFERENCE TO RELATED APPLICATIONS

The present invention is a non-Provisional application of and claims priority to U.S. Provisional Patent Application No. 63/369,093, filed on Jul. 22, 2022. The U.S. Provisional Patent Application is hereby incorporated by reference in its entirety.

FIELD OF THE INVENTION

The present invention relates to video coding system. In particular, the present invention relates to chroma intra prediction using a joint prediction mode by combining an intra prediction mode and one or more reference lines in a video coding system.

BACKGROUND

Versatile video coding (VVC) is the latest international video coding standard developed by the Joint Video Experts Team (JVET) of the ITU-T Video Coding Experts Group (VCEG) and the ISO/IEC Moving Picture Experts Group (MPEG). The standard has been published as an ISO standard: ISO/IEC 23090-3:2021, Information technology-Coded representation of immersive media—Part 3: Versatile video coding, published February 2021. VVC is developed based on its predecessor HEVC (High Efficiency Video Coding) by adding more coding tools to improve coding efficiency and also to handle various types of video sources including 3-dimensional (3D) video signals.

FIG. 1A illustrates an exemplary adaptive Inter/Intra video coding system incorporating loop processing. For Intra Prediction, the prediction data is derived based on previously coded video data in the current picture. For Inter Prediction 112, Motion Estimation (ME) is performed at the encoder side and Motion Compensation (MC) is performed based of the result of ME to provide prediction data derived from other picture(s) and motion data. Switch 114 selects Intra Prediction 110 or Inter-Prediction 112 and the selected prediction data is supplied to Adder 116 to form prediction errors, also called residues. The prediction error is then processed by Transform (T) 118 followed by Quantization (Q) 120. The transformed and quantized residues are then coded by Entropy Encoder 122 to be included in a video bitstream corresponding to the compressed video data. The bitstream associated with the transform coefficients is then packed with side information such as motion and coding modes associated with Intra prediction and Inter prediction, and other information such as parameters associated with loop filters applied to underlying image area. The side information associated with Intra Prediction 110, Inter prediction 112 and in-loop filter 130, are provided to Entropy Encoder 122 as shown in FIG. 1A. When an Inter-prediction mode is used, a reference picture or pictures have to be reconstructed at the encoder end as well. Consequently, the transformed and quantized residues are processed by Inverse Quantization (IQ) 124 and Inverse Transformation (IT) 126 to recover the residues. The residues are then added back to prediction data 136 at Reconstruction (REC) 128 to reconstruct video data. The reconstructed video data may be stored in Reference Picture Buffer 134 and used for prediction of other frames.

As shown in FIG. 1A, incoming video data undergoes a series of processing in the encoding system. The reconstructed video data from REC 128 may be subject to various impairments due to a series of processing. Accordingly, in-loop filter 130 is often applied to the reconstructed video data before the reconstructed video data are stored in the Reference Picture Buffer 134 in order to improve video quality. For example, deblocking filter (DF), Sample Adaptive Offset (SAO) and Adaptive Loop Filter (ALF) may be used. The loop filter information may need to be incorporated in the bitstream so that a decoder can properly recover the required information. Therefore, loop filter information is also provided to Entropy Encoder 122 for incorporation into the bitstream. In FIG. 1A, Loop filter 130 is applied to the reconstructed video before the reconstructed samples are stored in the reference picture buffer 134. The system in FIG. 1A is intended to illustrate an exemplary structure of a typical video encoder. It may correspond to the High Efficiency Video Coding (HEVC) system, VP8, VP9, H.264 or VVC.

The decoder, as shown in FIG. 1B, can use similar or portion of the same functional blocks as the encoder except for Transform 118 and Quantization 120 since the decoder only needs Inverse Quantization 124 and Inverse Transform 126. Instead of Entropy Encoder 122, the decoder uses an Entropy Decoder 140 to decode the video bitstream into quantized transform coefficients and needed coding information (e.g. ILPF information, Intra prediction information and Inter prediction information). The Intra prediction 150 at the decoder side does not need to perform the mode search. Instead, the decoder only needs to generate Intra prediction according to Intra prediction information received from the Entropy Decoder 140. Furthermore, for Inter prediction, the decoder only needs to perform motion compensation (MC 152) according to Inter prediction information received from the Entropy Decoder 140 without the need for motion estimation.

According to VVC, an input picture is partitioned into non-overlapped square block regions referred as CTUs (Coding Tree Units), similar to HEVC. Each CTU can be partitioned into one or multiple smaller size coding units (CUs). The resulting CU partitions can be in square or rectangular shapes. Also, VVC divides a CTU into prediction units (PUs) as a unit to apply prediction process, such as Inter prediction, Intra prediction, etc.

The VVC standard incorporates various new coding tools to further improve the coding efficiency over the HEVC standard. These coding tools relevant to the present invention are viewed as follows.

Partitioning of the CTUs Using a Tree Structure

In HEVC, a CTU is split into CUs by using a quaternary-tree (QT) structure denoted as coding tree to adapt to various local characteristics. The decision whether to code a picture area using inter-picture (temporal) or intra-picture (spatial) prediction is made at the leaf CU level. Each leaf CU can be further split into one, two or four Pus according to the PU splitting type. Inside one PU, the same prediction process is applied and the relevant information is transmitted to the decoder on a PU basis. After obtaining the residual block by applying the prediction process based on the PU splitting type, a leaf CU can be partitioned into transform units (TUs) according to another quaternary-tree structure similar to the coding tree for the CU. One of key feature of the HEVC structure is that it has the multiple partition conceptions including CU, PU, and TU.

FIG. 2 shows a CTU divided into multiple CUs with a quadtree and nested multi-type tree coding block structure, where the bold block edges represent quadtree partitioning and the remaining edges represent multi-type tree partitioning. The quadtree with nested multi-type tree partition provides a content-adaptive coding tree structure comprised of CUs. The size of the CU may be as large as the CTU or as small as 4×4 in units of luma samples. For the case of the 4:2:0 chroma format, the maximum chroma CB size is 64×64 and the minimum size chroma CB consist of 16 chroma samples.

In VVC, the maximum supported luma transform size is 64×64 and the maximum supported chroma transform size is 32×32. When the width or height of the CB is larger the maximum transform width or height, the CB is automatically split in the horizontal and/or vertical direction to meet the transform size restriction in that direction.

The following parameters are defined for the quadtree with nested multi-type tree coding tree scheme. These parameters are specified by SPS (Sequence Parameter Set) syntax elements and can be further refined by picture header syntax elements.

- CTU size: the root node size of a quaternary tree
- MinQTSize: the minimum allowed quaternary tree leaf node size
- MaxBtSize: the maximum allowed binary tree root node size
- MaxTtSize: the maximum allowed ternary tree root node size
- MaxMttDepth: the maximum allowed hierarchy depth of multi-type tree splitting from a quadtree leaf
- MinCbSize: the minimum allowed coding block node size In one example of the quadtree with nested multi-type tree coding tree structure, the CTU size is set as 128×128 luma samples with two corresponding 64×64 blocks of 4:2:0 chroma samples, the MinQTSize is set as 16×16, the MaxBtSize is set as 128×128 and MaxTtSize is set as 64×64, the MinCbsize (for both width and height) is set as 4×4, and the MaxMttDepth is set as 4. The quaternary tree partitioning is applied to the CTU first to generate quaternary tree leaf nodes. The quaternary tree leaf nodes may have a size from 16×16 (i.e., the MinQTSize) to 128×128 (i.e., the CTU size). If the leaf QT node is 128×128, it will not be further split by the binary tree since the size exceeds the MaxBtSize and MaxTtSize (i.e., 64×64). Otherwise, the leaf qdtree node can be further partitioned by the multi-type tree. Therefore, the quaternary tree leaf node is also the root node for the multi-type tree and it has multi-type tree depth (mttDepth) as 0. When the multi-type tree depth reaches MaxMttDepth (i.e., 4), no further splitting is considered. When the multi-type tree node has width equal to MinCbsize, no further horizontal splitting is considered. Similarly, when the multi-type tree node has height equal to MinCbsize, no further vertical splitting is considered.

In VVC, the coding tree scheme supports the ability for the luma and chroma to have a separate block tree structure. For P and B slices, the luma and chroma CTBs in one CTU have to share the same coding tree structure. However, for I slices, the luma and chroma can have separate block tree structures. When the separate block tree mode is applied, luma CTB is partitioned into CUs by one coding tree structure, and the chroma CTBs are partitioned into chroma CUs by another coding tree structure. This means that a CU in an I slice may consist of a coding block of the luma component or coding blocks of two chroma components, and a CU in a P or B slice always consists of coding blocks of all three colour components unless the video is monochrome.

Intra Chroma Partitioning and Prediction Restriction

In typical hardware video encoders and decoders, processing throughput drops when a picture has smaller intra blocks because of sample processing data dependency between neighbouring intra blocks. The predictor generation of an intra block requires top and left boundary reconstructed samples from neighbouring blocks. Therefore, intra prediction has to be sequentially processed block by block.

In HEVC, the smallest intra CU is 8×8 luma samples. The luma component of the smallest intra CU can be further split into four 4×4 luma intra prediction units (PUs), but the chroma components of the smallest intra CU cannot be further split. Therefore, the worst case hardware processing throughput occurs when 4×4 chroma intra blocks or 4×4 luma intra blocks are processed. In VVC, in order to improve worst case throughput, chroma intra CBs smaller than 16 chroma samples (size 2×2, 4×2, and 2×4) and chroma intra CBs with width smaller than 4 chroma samples (size 2×N) are disallowed by constraining the partitioning of chroma intra CBs.

In single coding tree, a smallest chroma intra prediction unit (SCIPU) is defined as a coding tree node whose chroma block size is larger than or equal to 16 chroma samples and has at least one child luma block smaller than 64 luma samples, or a coding tree node whose chroma block size is not 2×N and has at least one child luma block 4×N luma samples. It is required that in each SCIPU, all CBs are inter, or all CBs are non-inter, i.e., either intra or intra block copy (IBC). In case of a non-inter SCIPU, it is further required that chroma of the non-inter SCIPU shall not be further split and luma of the SCIPU is allowed to be further split. In this way, the small chroma intra CBs with size less than 16 chroma samples or with size 2×N are removed. In addition, chroma scaling is not applied in case of a non-inter SCIPU. Here, no additional syntax is signalled, and whether a SCIPU is non-inter can be derived by the prediction mode of the first luma CB in the SCIPU. The type of a SCIPU is inferred to be non-inter if the current slice is an I-slice or the current SCIPU has a 4×4 luma partition in it after further split one time (because no inter 4×4 is allowed in VVC); otherwise, the type of the SCIPU (inter or non-inter) is indicated by one flag before parsing the CUs in the SCIPU.

For the dual tree in intra picture, the 2×N intra chroma blocks are removed by disabling vertical binary and vertical ternary splits for 4×N and 8×N chroma partitions, respectively. The small chroma blocks with sizes 2×2, 4×2, and 2×4 are also removed by partitioning restrictions.

In addition, a restriction on picture size is considered to avoid 2×2/2×4/4×2/2×N intra chroma blocks at the corner of pictures by considering the picture width and height to be multiple of max (8, MinCbSizeY).

Intra Mode Coding with 67 Intra Prediction Modes

To capture the arbitrary edge directions presented in natural video, the number of directional intra modes in VVC is extended from 33, as used in HEVC, to 65. The new directional modes not in HEVC are depicted as red dotted arrows in FIG. 3, and the planar and DC modes remain the same. These denser directional intra prediction modes apply for all block sizes and for both luma and chroma intra predictions.

In VVC, several conventional angular intra prediction modes are adaptively replaced with wide-angle intra prediction modes for the non-square blocks.

In HEVC, every intra-coded block has a square shape and the length of each of its side is a power of 2. Thus, no division operations are required to generate an intra-predictor using DC mode. In VVC, blocks can have a rectangular shape that necessitates the use of a division operation per block in the general case. To avoid division operations for DC prediction, only the longer side is used to compute the average for non-square blocks.

To keep the complexity of the most probable mode (MPM) list generation low, an intra mode coding method with 6 MPMs is used by considering two available neighbouring intra modes. The following three aspects are considered to construct the MPM list:

Default intra modes

Neighbouring intra modes

Derived intra modes.

A unified 6-MPM list is used for intra blocks irrespective of whether MRL and ISP coding tools are applied or not. The MPM list is constructed based on intra modes of the left and above neighbouring block. Suppose the mode of the left is denoted as Left and the mode of the above block 15 is denoted as Above, the unified MPM list is constructed as follows:

- When a neighbouring block is not available, its intra mode is set to Planar by default.
- If both modes Left and Above are non-angular modes:
  - MPM list→{Planar, DC, V, H, V−4, V+4}
- If one of modes Left and Above is angular mode, and the other is non-angular:
  - Set a mode Max as the larger mode in Left and Above
  - MPM list→{Planar, Max, Max−1, Max+1, Max−2, M+2}
- If Left and Above are both angular and they are different:
  - Set a mode Max as the larger mode in Left and Above
  - If Max−Min is equal to 1:
    - MPM list→{Planar, Left, Above, Min−1, Max+1, Min−2}
  - Otherwise, if Max−Min is greater than or equal to 62:
    - MPM list→{Planar, Left, Above, Min+1, Max−1, Min+2}
  - Otherwise, if Max−Min is equal to 2:
    - MPM list→{Planar, Left, Above, Min+1, Min−1, Max+1}
  - Otherwise:
    - MPM list→{Planar, Left, Above, Min−1, −Min+1, Max−1}
- If Left and Above are both angular and they are the same:
  - MPM list→{Planar, Left, Left−1, Left+1, Left−2, Left+2}

Besides, the first bin of the MPM index codeword is CABAC context coded. In total three contexts are used, corresponding to whether the current intra block is MRL enabled, ISP enabled, or a normal intra block.

During 6 MPM list generation process, pruning is used to remove duplicated modes so that only unique modes can be included into the MPM list. For entropy coding of the 61 non-MPM modes, a Truncated Binary Code (TBC) is used.

Wide-Angle Intra Prediction for Non-Square Blocks

Conventional angular intra prediction directions are defined from 45 degrees to −135 degrees in clockwise direction. In VVC, several conventional angular intra prediction modes are adaptively replaced with wide-angle intra prediction modes for non-square blocks. The replaced modes are signalled using the original mode indexes, which are remapped to the indexes of wide angular modes after parsing. The total number of intra prediction modes is unchanged, i.e., 67, and the intra mode coding method is unchanged.

To support these prediction directions, the top reference with length 2W+1, and the left reference with length 2H+1, are defined as shown in FIG. 4A and FIG. 4B respectively.

The number of replaced modes in wide-angular direction mode depends on the aspect ratio of a block. The replaced intra prediction modes are illustrated in Table 1.

TABLE 1

Intra prediction modes replaced by wide-angular modes

| Aspect ratio | Replaced intra prediction modes |
|---|---|
| W / H == 16 | Modes 12, 13, 14, 15 |
| W / H == 8 | Modes 12, 13 |
| W / H == 4 | Modes 2, 3, 4, 5, 6, 7, 8, 9, 10, 11 |
| W / H == 2 | Modes 2, 3, 4, 5, 6, 7, |
| W / H == 1 | None |
| W / H == ½ | Modes 61, 62, 63, 64, 65, 66 |
| W / H == ¼ | Mode 57, 58, 59, 60, 61, 62, 63, 64, 65, 66 |
| W / H == ⅛ | Modes 55, 56 |
| W / H == 1/16 | Modes 53, 54, 55, 56 |

In VVC, 4:2:2 and 4:4:4 chroma formats are supported as well as 4:2:0. Chroma derived mode (DM) derivation table for 4:2:2 chroma format was initially ported from HEVC extending the number of entries from 35 to 67 to align with the extension of intra prediction modes. Since HEVC specification does not support prediction angle below −135° and above 45°, luma intra prediction modes ranging from 2 to 5 are mapped to 2. Therefore, chroma DM derivation table for 4:2:2: chroma format is updated by replacing some values of the entries of the mapping table to convert prediction angle more precisely for chroma blocks.

Chroma DM Mode

For Chroma DM mode, the intra prediction mode of the corresponding (collocated) luma block covering the centre position of the current chroma block is directly inherited.

4-Tap Interpolation Filter and Reference Sample Smoothing

Four-tap intra interpolation filters are utilized to improve the directional intra prediction accuracy. In HEVC, a two-tap linear interpolation filter has been used to generate the intra prediction block in the directional prediction modes (i.e., excluding Planar and DC predictors). In VVC, the two sets of 4-tap IFs replace lower precision linear interpolation as in HEVC, where one is a DCT-based interpolation filter (DCTIF) and the other one is a 4-tap smoothing interpolation filter (SIF). The DCTIF is constructed in the same way as the one used for chroma component motion compensation in both HEVC and VVC. The SIF is obtained by convolving the 2-tap linear interpolation filter with [1 2 1]/4 filter.

Depending on the intra prediction mode, the following reference samples processing is performed:

- The directional intra-prediction mode is classified into one of the following groups:
  - Group A: vertical or horizontal modes (HOR_IDX, VER_IDX),
  - Group B: directional modes that represent non-fractional angles (−14, −12, −10, −6, 2, 34, 66, 72, 76, 78, 80,) and Planar mode,
  - Group C: remaining directional modes;
- If the directional intra-prediction mode is classified as belonging to group A, then then no filters are applied to reference samples to generate predicted samples;
- Otherwise, if a mode falls into group B and the mode is a directional mode, and all of following conditions are true, then a [1, 2, 1] reference sample filter may be applied (depending on the MDIS condition) to reference samples to further copy these filtered values into an intra predictor according to the selected direction, but no interpolation filters are applied:

refIdx is equal to 0 (no MRL)

TU size is greater than 32

Luma

No ISP block

Otherwise, if a mode is classified as belonging to group C, MRL (Multiple Reference Lines) index is equal to 0, and the current block is not ISP block, then only an intra reference sample interpolation filter is applied to reference samples to generate a predicted sample that falls into a fractional or integer position between reference samples according to a selected direction (no reference sample filtering is performed). The interpolation filter type is determined as follows:

Set minDistVerHor equal to Min(Abs(predModeIntra−50), Abs(predModeIntra−18))

Set nTbS equal to (Log 2(W)+Log 2(H))>>1

Set intraHorVerDistThres[nTbS] as specified in Table 2 below:

TABLE 2

Table for intraHorVerDistThres[nTbs]

| | nTbS = 2 | nTbS = 3 | nTbS = 4 | nTbS = 5 | nTbS = 6 | nTbS = 7 |
|---|---|---|---|---|---|---|
| intraHorVerDistThres[nTbS] | 24 | 14 | 2 | 0 | 0 | 0 |

If minDistVerHor is greater than intraHorVerDistThres[nTbS], SIF is used for the interpolation Otherwise, DCTIF is used for the interpolation DIMD (Decoder-Side Intra Mode Derivation) Chroma Mode The DIMD chroma mode uses the DIMD derivation method to derive the chroma intra prediction mode of the current block based on the neighbouring reconstructed Y, Cb and Cr samples in the second neighbouring row and column as shown in FIG. 5. In FIG. 5, areas 510, 520 and 530 correspond to collocated Y block, current Cb block and current Cr block. The circles outside areas 510, 520 and 530 correspond to respective neighbouring reconstructed samples. The grey circles represent the sample locations where the gradients are determined for DIMD. Specifically, a horizontal gradient and a vertical gradient are calculated for each collocated reconstructed luma sample of the current chroma block, as well as the reconstructed Cb and Cr samples, to build a HoG. Then the intra prediction mode with the largest histogram amplitude values is used for performing chroma intra prediction of the current chroma block.

When the intra prediction mode derived from the DIMD chroma mode is the same as the intra prediction mode derived from the DM mode, the intra prediction mode with the second largest histogram amplitude value is used as the DIMD chroma mode.

A CU level flag is signalled to indicate whether the proposed DIMD chroma mode is applied as shown in the Table 3.

TABLE 3

The binarization process for intra_chroma_pred_mode in the proposed method

| intra_chroma_pred_mode | bin string | chroma intra mode |
|---|---|---|
| 0 | 1100 | list[0] |
| 1 | 1101 | list[1] |
| 2 | 1110 | list[2] |
| 3 | 1111 | list[3] |
| 4 | 10 | DIMD chroma |
| 5 | 0 | DM |

Fusion of Chroma Intra Prediction Modes

According to this method, the DM mode and the four default modes can be fused with the MMLM_LT mode as follows:

$$pred=(w0*pred0+w1*pred1+(1\ll(shift-1)))\gg shift, \qquad (1)$$

where pred0 is the predictor obtained by applying the non-LM mode, pred1 is the predictor obtained by applying the MMLM_LT mode and pred is the final predictor of the current chroma block. The two weights, w0 and w1 are determined by the intra prediction mode of adjacent chroma blocks and shift is set equal to 2. Specifically, when the above and left adjacent blocks are both coded with LM modes, {w0, w1}={1, 3}; when the above and left adjacent blocks are both coded with non-LM modes, {w0, w1}={3, 1}; otherwise, {w0, w1}={2, 2}.

For the syntax design, if a non-LM mode is selected, one flag is signalled to indicate whether the fusion is applied. And the proposed fusion is only applied to I slices.

DIMD Chroma Mode with Fusion

The DIMD chroma mode and the fusion of chroma intra prediction modes are combined. Specifically, the DIMD chroma mode described is applied, and for I slices, the DM mode, the four default modes and the DIMD chroma mode can be fused with the MMLM_LT mode using the weights described, while for non-I slices, only the DIMD chroma mode can be fused with the MMLM_LT mode using equal weights.

Cross-Component Linear Model (CCLM) Prediction

To reduce the cross-component redundancy, a cross-component linear model (CCLM) prediction mode is used in the VVC, for which the chroma samples are predicted based on the reconstructed luma samples of the same CU by using a linear model as follows:

$$pred_C(i,j)=\alpha\cdot rec_L'(i,j)+\beta \qquad (2)$$

where $pred_C(i, j)$ represents the predicted chroma samples in a CU and $rec_L'(i, j)$ represents the downsampled reconstructed luma samples of the same CU.

The CCLM parameters (α and β) are derived with at most four neighbouring chroma samples and their corresponding down-sampled luma samples. Suppose the current chroma block dimensions are W×H, then W' and H' are set as W'=W, H'=H when LM_LA (i.e., using both the left and above templates) mode is applied;

W'=W+H when LM_A (i.e., only using the above template) mode is applied;

H'=H+W when LM_L (i.e., only using the left template) mode is applied.

The above template is also referred as a top template and LM_LA and LM_A may also be referred as LM_LT and LM_T modes. Sometimes, these modes are also referred as CCLM_LT, CCLM_L and CCLM_T modes. They may also be referred as LM modes for short. The above neighbouring positions are denoted as S[0, −1] . . . S[W'−1, −1] and the left neighbouring positions are denoted as S[−1, 0] . . . S[−1, H'−1]. Then the four samples are selected as S[W'/4, −1], S[3*W'/4, −1], S[−1, H'/4], S[−1, 3*H'/4] when LM mode is applied and both above and left neighbouring samples are available;

S[W'/8, −1], S[3*W'/8, −1], S[5*W'/8, −1], S[7*W'/8, −1] when LM-A mode is applied or only the above neighbouring samples are available;

S[−1, H'/8], S[−1, 3*H'/8], S[−1, 5*H'/8], S[−1, 7*H'/8] when LM-L mode is applied or only the left neighbouring samples are available.

The four neighbouring luma samples at the selected positions are down-sampled and compared four times to find two larger values: $x^0_A$ and $x^1_A$, and two smaller values: $x^0_B$ and $x^1_B$. Their corresponding chroma sample values are denoted as $y^0_A$, $y^1_A$, $y^0_B$ and $y^1_B$. Then $x_A$, $x_B$, $y_A$ and $y_B$ are derived as:

$$Xa = (x0A + x1A + 1) \gg 1; \quad (3)$$

$$Xb = (x0B + x1B + 1) \gg 1;$$

$$Ya = (y0A + y1A + 1) \gg 1;$$

$$Yb = (y0B + y1B + 1) \gg 1$$

Finally, the linear model parameters a and B are obtained according to the following equations.

$$\alpha = \frac{Y_a - Y_b}{X_a - X_b} \quad (4)$$

$$\beta = Y_b - \alpha \cdot X_b \quad (5)$$

FIG. 6 shows an example of the location of the left and above samples and the sample of the current block involved in the LM_LA mode. FIG. 6 shows the relative sample locations of N×N chroma block 610, the corresponding 2N×2N luma block 620 and their neighbouring samples (shown as filled circles).

The division operation to calculate parameter a is implemented with a look-up table. To reduce the memory required for storing the table, the diff value (difference between maximum and minimum values) and the parameter a are expressed by an exponential notation. For example, diff is approximated with a 4-bit significant part and an exponent. Consequently, the table for 1/diff is reduced into 16 elements for 16 values of the significand as follows:

$$DivTable[16] = \{0, 7, 6, 5, 5, 4, 4, 3, 3, 2, 2, 1, 1, 1, 1, 0\} \quad (6)$$

This would have a benefit of both reducing the complexity of the calculation as well as the memory size required for storing the needed tables.

Besides the above template and left template can be used to calculate the linear model coefficients together, they also can be used alternatively in the other 2 LM modes, called LM_A, and LM_L modes.

In LM_A mode, only the above template is used to calculate the linear model coefficients. To get more samples, the above template is extended to (W+H) samples. In LM_L mode, only left template are used to calculate the linear model coefficients. To get more samples, the left template is extended to (H+W) samples.

In LM_LA mode, left and above templates are used to calculate the linear model coefficients.

To match the chroma sample locations for 4:2:0 video sequences, two types of down-sampling filter are applied to luma samples to achieve 2 to 1 down-sampling ratio in both horizontal and vertical directions. The selection of down-sampling filter is specified by a SPS level flag. The two down-sampling filters are as follows, which are corresponding to "type-0" and "type-2" content, respectively.

$$Rec'_L(i, j) = [rec_L(2i-1, 2j-1) + 2 \cdot rec_L(2i-1, 2j-1) + rec_L(2i+1, 2j-1) + rec_L(2i-1, 2j) + 2 \cdot rec_L(2i, 2j) + rec_L(2i+1, 2j) + 4] \gg 3 \quad (7)$$

$$Rec'_L(i, j) = rec_L(2i, 2j-1) + rec_L(2i-1, 2j) + 4 \cdot rec_L(2i, 2j) + rec_L(2i+1, 2j) + rec_L(2i, 2j+1) + 4] \gg 3 \quad (8)$$

Note that only one luma line (general line buffer in intra prediction) is used to make the down-sampled luma samples when the upper reference line is at the CTU boundary.

This parameter computation is performed as part of the decoding process, and is not just as an encoder search operation. As a result, no syntax is used to convey the a and B values to the decoder.

For chroma intra mode coding, a total of 8 intra modes are allowed for chroma intra mode coding. Those modes include five traditional intra modes and three cross-component linear model modes (LM_LA, LM_A, and LM_L). Chroma mode signalling and derivation process are shown in Table 4. Chroma mode coding directly depends on the intra prediction mode of the corresponding luma block. Since separate block partitioning structure for luma and chroma components is enabled in I slices, one chroma block may correspond to multiple luma blocks. Therefore, for Chroma DM mode, the intra prediction mode of the corresponding luma block covering the centre position of the current chroma block is directly inherited.

TABLE 4

| Derivation of chroma prediction mode from luma mode when cclm_is enabled | | | | | |
|---|---|---|---|---|---|
| Chroma | Corresponding luma intra prediction mode | | | | |
| prediction mode | 0 | 50 | 18 | 1 | X (0 <= X <= 66) |
| 0 | 66 | 0 | 0 | 0 | 0 |
| 1 | 50 | 66 | 50 | 50 | 50 |
| 2 | 18 | 18 | 66 | 18 | 18 |
| 3 | 1 | 1 | 1 | 66 | 1 |
| 4 | 0 | 50 | 18 | 1 | X |
| 5 | 81 | 81 | 81 | 81 | 81 |
| 6 | 82 | 82 | 82 | 82 | 82 |
| 7 | 83 | 83 | 83 | 83 | 83 |

A single binarization table is used regardless of the value of sps_cclm_enabled_flag as shown in Table 5.

TABLE 5

| Unified binarization table for chroma prediction mode | |
|---|---|
| Value of intra_chroma_pred_mode | Bin string |
| 4 | 00 |
| 0 | 0100 |
| 1 | 0101 |
| 2 | 0110 |
| 3 | 0111 |
| 5 | 10 |
| 6 | 110 |
| 7 | 111 |

In Table 5, the first bin indicates whether it is regular (0) or CCLM modes (1). If it is LM mode, then the next bin indicates whether it is LM_LA (0) or not. If it is not LM_LA, next 1 bin indicates whether it is LM_L (0) or LM_A (1). For this case, when sps_cclm_enabled_flag is 0, the first bin of the binarization table for the corresponding intra_chroma_pred_mode can be discarded prior to the entropy coding. Or, in other words, the first bin is inferred to be 0 and hence not coded. This single binarization table is used for both sps_cclm_enabled_flag equal to 0 and 1 cases. The first two bins in Table 5 are context coded with its own context model, and the rest bins are bypass coded.

In addition, in order to reduce luma-chroma latency in dual tree, when the 64×64 luma coding tree node is partitioned with Not Split (and ISP is not used for the 64×64 CU) or QT, the chroma CUs in 32×32/32×16 chroma coding tree node are allowed to use CCLM in the following way:

- If the 32×32 chroma node is not split or partitioned QT split, all chroma CUs in the 32×32 node can use CCLM
- If the 32×32 chroma node is partitioned with Horizontal BT, and the 32×16 child node does not split or uses Vertical BT split, all chroma CUs in the 32×16 chroma node can use CCLM.

In all the other luma and chroma coding tree split conditions, CCLM is not allowed for chroma CU.

Multiple Model CCLM (MMLM)

In the JEM (J. Chen, E. Alshina, G. J. Sullivan, J.-R. Ohm, and J. Boyce, Algorithm Description of Joint Exploration Test Model 7, document JVET-G1001, ITU-T/ISO/IEC Joint Video Exploration Team (JVET), July 2017), multiple model CCLM mode (MMLM) is proposed for using two models for predicting the chroma samples from the luma samples for the whole CU. In MMLM, neighbouring luma samples and neighbouring chroma samples of the current block are classified into two groups, each group is used as a training set to derive a linear model (i.e., a particular a and B are derived for a particular group). Furthermore, the samples of the current luma block are also classified based on the same rule for the classification of neighbouring luma samples.

FIG. 7 shows an example of classifying the neighbouring samples into two groups. Threshold is calculated as the average value of the neighbouring reconstructed luma samples. A neighbouring sample with $Rec'_L[x,y]$<=Threshold is classified into group 1; while a neighbouring sample with $Rec'_L[x,y]$>Threshold is classified into group 2.

$$\begin{cases} Pred_C[x, y] = \alpha_1 \times Rec'_L[x, y] + \beta_1 \text{ if } Rec'_L[x, y] \le \text{Threshold} \\ Pred_C[x, y] = \alpha_2 \times Rec'_L[x, y] + \beta_2 \text{ if } Rec'_L[x, y] > \text{Threshold} \end{cases} \quad (9)$$

Self-Aware Filter Estimation CCLM

A self-aware filter estimation CCLM (SAFE-CCLM) method was disclosed to explore the advantage of multiple down-sampling filters without signalling the filter index. With SAFE-CCLM, N candidate luma down-sampling filters are predefined. When SAFE-CCLM is applied, a linear model between luma and chroma component is derived in the same way as that in ECM for each candidate filter first. Second, prediction values are calculated with each linear model in a testing region including one-column left neighbouring samples and one-row above neighbouring samples. Third, a SAD (Sum of Absolute Differences) cost between the reconstructed samples and their corresponding prediction values in the testing region is computed for each filter candidate. Finally, the filter candidate with the least SAD cost is selected as the down-sampling filter to perform the CCLM prediction for the current block. When CCLM is indicated to be used for a block, a SAFE-CCLM flag is signalled to further indicate whether SAFE-CCLM is applied.

With SAFE-CCLM, N candidate luma down-sampling filters are predefined. As shown in FIG. 8, the down-sampling filtering process for 4:2:0 colour format is performed as $$Rec'_L(x, y) = \{c_0 Rec_L(2x-1, 2y) + c_1 Rec_L(2x, 2y) + c_2 Rec_L(2x+1, 2y) + c_3 Rec_L(2x-1, 2y+1) + c_4 Rec_L(2x, 2y+1) + c_5 Rec_L(2x+1, 2y+1) + 4\} >> 3,$$

where $Rec_L(x, y)$ and $Rec'_L(x, y)$ are reconstructed luma samples before and after the down-sampling filtering at position (x, y), and $\{c_0, c_1, c_2, c_3, c_4, c_5\}$ are filtering coefficients. It should be noted that $\{c_0, c_1, c_2, c_3, c_4, c_5\}$ is set to {1, 2, 1, 1, 2, 1} in the current ECM. N candidate luma sampling filters with different coefficients are predefined by SAFE-CCLM.

FIG. 9 shows a flowchart of SAFE-CCLM. First, when SAFE-CCLM is applied, a linear model between luma and chroma component is derived for a current block 910 in the same way as that in ECM for each candidate filter. Second, prediction values are calculated with each linear model in a testing region including one-column left neighbouring samples and one-row above neighbouring samples. Third, a SAD cost between the reconstructed chroma samples and their corresponding prediction values in the testing region (area 912 and 914) is computed for each filter candidate. Finally, the filter candidate (920) with the least SAD cost is selected as the down-sampling filter to perform the CCLM prediction for the current block.

When CCLM is indicated to be used for a block, a SAFE-CCLM flag is signalled to further indicate whether SAFE-CCLM is applied.

According to SAFE-CCLM, for N=32, the filter candidate set is tabulated in Table 6.

TABLE 6

| Filter candidate set when N = 32 | | | |
|---|---|---|---|
| F0 | F1 | F2 | F3 |
| $\frac{1}{4}\begin{bmatrix} 0 & 1 & 1 \\ 0 & 1 & 1 \end{bmatrix}$ | $\frac{1}{2}\begin{bmatrix} 0 & 1 & 1 \\ 0 & 0 & 0 \end{bmatrix}$ | $\frac{1}{2}\begin{bmatrix} 0 & 0 & 1 \\ 0 & 0 & 1 \end{bmatrix}$ | $\frac{1}{2}\begin{bmatrix} 0 & 1 & 0 \\ 0 & 1 & 0 \end{bmatrix}$ |
| F4 | F5 | F6 | F7 |
| $\frac{1}{2}\begin{bmatrix} 0 & 1 & -1 \\ 0 & 1 & -1 \end{bmatrix}$ | $\frac{1}{4}\begin{bmatrix} 1 & 2 & 1 \\ -1 & -2 & -1 \end{bmatrix}$ | $\frac{1}{2}\begin{bmatrix} 0 & 1 & 0 \\ 0 & -1 & 0 \end{bmatrix}$ | $\frac{1}{2}\begin{bmatrix} 0 & 0 & 1 \\ 0 & 0 & -1 \end{bmatrix}$ |
| F8 | F9 | F10 | F11 |
| $\begin{bmatrix} 0 & 1 & 0 \\ 0 & 0 & 0 \end{bmatrix}$ | $\begin{bmatrix} 0 & 0 & 1 \\ 0 & 0 & 0 \end{bmatrix}$ | $\begin{bmatrix} 0 & 0 & 0 \\ 0 & 1 & 0 \end{bmatrix}$ | $\begin{bmatrix} 0 & 0 & 0 \\ 0 & 0 & 1 \end{bmatrix}$ |
| F12 | F13 | F14 | F15 |
| $\begin{bmatrix} 1 & 0 & 0 \\ 0 & 0 & 0 \end{bmatrix}$ | $\begin{bmatrix} 0 & 0 & 0 \\ 1 & 0 & 0 \end{bmatrix}$ | $\frac{1}{4}\begin{bmatrix} 1 & 2 & 1 \\ 0 & 0 & 0 \end{bmatrix}$ | $\frac{1}{4}\begin{bmatrix} 0 & 0 & 0 \\ 1 & 2 & 1 \end{bmatrix}$ |
| F16 | F17 | F18 | F19 |
| $\frac{1}{2}\begin{bmatrix} -1 & 1 & 0 \\ -1 & 1 & 0 \end{bmatrix}$ | $\frac{1}{2}\begin{bmatrix} -1 & 0 & 1 \\ -1 & 0 & 1 \end{bmatrix}$ | $\frac{1}{2}\begin{bmatrix} 0 & 1 & -1 \\ 0 & 1 & -1 \end{bmatrix}$ | $\frac{1}{4}\begin{bmatrix} 3 & 6 & 3 \\ -1 & -2 & -1 \end{bmatrix}$ |
| F20 | F21 | F22 | F23 |
| $\frac{1}{2}\begin{bmatrix} 0 & 1 & 0 \\ 0 & 0 & -1 \end{bmatrix}$ | $\frac{1}{2}\begin{bmatrix} 0 & 0 & 1 \\ 0 & -1 & 0 \end{bmatrix}$ | $\frac{1}{2}\begin{bmatrix} 0 & 1 & 0 \\ -1 & 0 & 0 \end{bmatrix}$ | $\frac{1}{2}\begin{bmatrix} 1 & 0 & 0 \\ 0 & -1 & 0 \end{bmatrix}$ |
| F24 | F25 | F26 | F27 |
| $\begin{bmatrix} -1 & 2 & -1 \\ -1 & 2 & -1 \end{bmatrix}$ | $\begin{bmatrix} 0 & 0 & 1 \\ -1 & 0 & 0 \end{bmatrix}$ | $\begin{bmatrix} 1 & 0 & 0 \\ 0 & 0 & -1 \end{bmatrix}$ | $\frac{1}{4}\begin{bmatrix} 1 & 0 & 1 \\ 1 & 0 & 1 \end{bmatrix}$ |
| F28 | F29 | F30 | F31 |
| $\begin{bmatrix} 1 & 1 & 0 \\ 1 & -1 & 0 \end{bmatrix}$ | $\begin{bmatrix} 0 & 1 & 1 \\ 0 & -1 & 1 \end{bmatrix}$ | $\begin{bmatrix} 1 & 0 & 1 \\ 0 & 1 & 0 \end{bmatrix}$ | $\begin{bmatrix} 0 & 1 & 0 \\ 1 & 0 & 1 \end{bmatrix}$ |

While the CCLM mode can improve coding efficiency, it is desirable to develop techniques to further improve the efficiency for chroma intra prediction.

BRIEF SUMMARY OF THE INVENTION

A method and apparatus for video coding are disclosed. According to the method, input data associated with a current block are received, wherein the input data comprise pixel data for the current block to be encoded at an encoder side or encoded data associated with the current block to be decoded at a decoder side. A set of joint prediction candidates are determined, wherein each joint prediction candidate corresponds to a combination of an intra prediction mode from a group of intra prediction mode candidates and one or more reference samples in one or more reference lines from a group of reference line candidates. A target joint prediction candidate is determined from the set of joint prediction candidates. The current block is encoded or decoded by using one or more predictors comprising the target joint prediction candidate.

In one embodiment, said one or more reference samples comprise one or more predicted samples or one or more reconstructed samples in one or more non-adjacent neighbouring lines of the current block. In one embodiment, said one or more reference samples further comprise one or more predicted samples or one or more reconstructed samples in an adjacent neighbouring line of the current block.

In one embodiment, an index indicating the target joint prediction candidate from the set of joint prediction candidates is signalled at the encoder side or parsed at the decoder side.

In one embodiment, a set of indexes are mapped to the set of joint prediction candidates according to cost measurement associated with members of the set of joint prediction candidates. In one embodiment, the cost measurement corresponds to boundary matching cost or template matching cost for members of the set of joint prediction candidates. In one embodiment, the set of joint prediction candidates are reordered according to the cost measurement, and a shortest codeword is assigned to a target index with a smallest cost measurement. In one embodiment, a target index indicating the target joint prediction candidate from the set of joint prediction candidates for the current block is signalled at the encoder side or parsed at the decoder side. In one embodiment, first K joint prediction candidates with smallest cost measurement are mapped to the set of indexes, and K is a positive integer. In one embodiment, when the K is equal to 1, a target index indicating the target joint prediction candidate from the set of joint prediction candidates for the current block is not signalled at the encoder side or the target index is inferred at the decoder side.

In one embodiment, the group of intra prediction mode candidates comprise all available intra prediction modes or a subset of said all available intra prediction modes.

In one embodiment, the group of intra prediction mode candidates, the group of reference line candidates, or both are determined according to block size of the current block.

In one embodiment, the target joint prediction candidate is used to replace original intra prediction. In one embodiment, whether the target joint prediction candidate is used to replace the original intra prediction is enabled or disabled depending on a signalled syntax or is determined implicitly.

In another embodiment, the final intra prediction is selected between the target joint prediction candidate and original intra prediction. In one embodiment, whether the target joint prediction candidate is used to replace the original intra prediction is enabled or disable depending on a signalled syntax or is determined implicitly.

In one embodiment, the target joint prediction candidate is used to encode or decode a chroma block of the current block, and the group of intra prediction mode candidates for chroma MRL (multiple reference lines) prediction comprise planar, vertical, horizontal, DC, one or more LM modes, chroma DM, DIMD chroma mode, diagonal (DIA), VDIA (mode 66 in 67 intra prediction modes), or any combination thereof.

DETAILED DESCRIPTION OF THE INVENTION

It will be readily understood that the components of the present invention, as generally described and illustrated in the figures herein, may be arranged and designed in a wide variety of different configurations. Thus, the following more detailed description of the embodiments of the systems and methods of the present invention, as represented in the figures, is not intended to limit the scope of the invention, as claimed, but is merely representative of selected embodiments of the invention. References throughout this specification to "one embodiment," "an embodiment," or similar language mean that a particular feature, structure, or characteristic described in connection with the embodiment may be included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention. The illustrated embodiments of the invention will be best understood by reference to the drawings, wherein like parts are designated by like numerals throughout. The following description is intended only by way of example, and simply illustrates certain selected embodiments of apparatus and methods that are consistent with the invention as claimed herein.

Figure 10A:
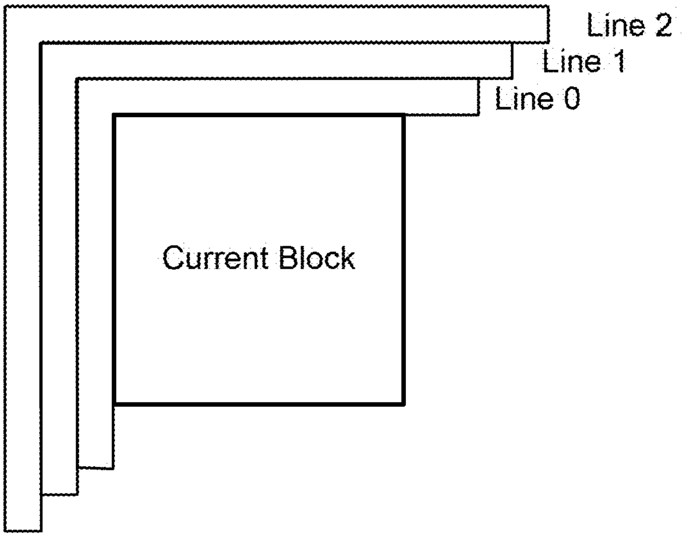
FIG. 10A illustrates an example of non-adjacent reference samples of the current block, where line 0 is used in the traditional prediction, and line 1 and line 2 are the non-adjacent reference samples for the current block.
Figure 10B:
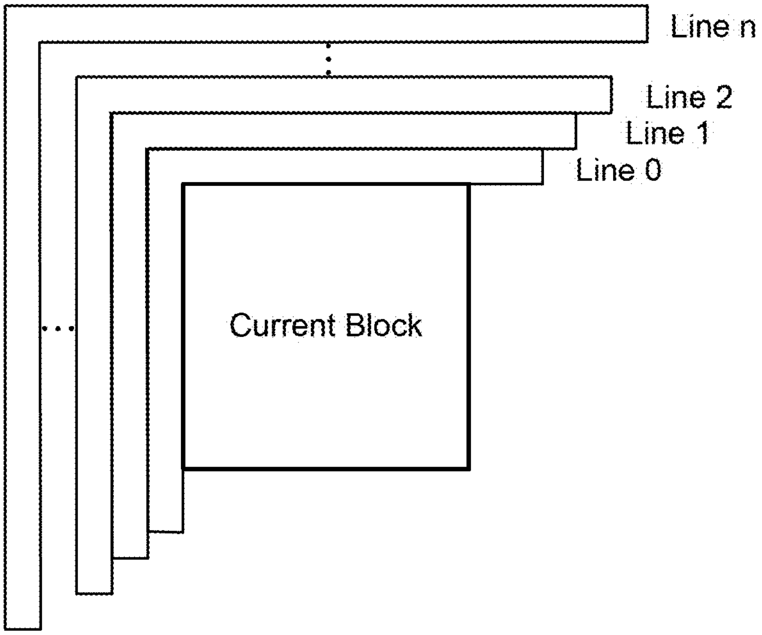
FIG. 10B illustrates an example of extended non-adjacent reference lines.

The following methods are proposed to improve the accuracy for cross-component prediction and/or intra/inter prediction. In the traditional prediction scheme, the reference samples of the current block (e.g. neighbouring predicted and/or neighbouring reconstructed samples of the current block) are adjacent to the left and/or top boundary within the current block. In this invention, it is proposed to use "the non-adjacent neighbouring predicted and/or neighbouring reconstructed samples" (or named as non-adjacent reference samples) as the reference samples of the current block. The following is an example of non-adjacent reference samples of the current block as shown in FIG. 10A. Line 0 is used in the traditional prediction, and line 1 and line 2 are the non-adjacent reference samples for the current block. As shown in FIG. 10A, Line O refers to pixels in the row immediately above the top boundary of the current block and pixels in the column immediately to the left boundary of the current block. The segment of the row or column of Line 0 may be longer or shorter than the example shown in FIG. 10A. Similarly, Line I refers to pixels in the row immediately above the top part of Line 0 and pixels in the column immediately to the left part of Line 0. Again, the segment of the row or column of Line I may be longer or shorter than the example shown in FIG. 10A. Similar conditions apply to Line 2 in FIG. 10A and Line n in FIG. 10B. In one embodiment, the non-adjacent reference samples in the present invention can be one or more non-adjacent reference lines (such as line 1 and/or line 2) as shown in this example. In another embodiment, the non-adjacent reference samples in this proposal are not limited to line 1 and line 2. For another example, the non-adjacent reference samples in the present invention can be any extended non-adjacent reference lines (such as line n) as shown in FIG. 10B. In another embodiment, the non-adjacent reference samples in this proposal can be any subset of samples in each of the selected one or more non-adjacent reference lines.

In another embodiment, a flag (e.g. SPS flag) is signalled to indicate that, in addition to the adjacent reference line (used in the traditional prediction), whether one or more non-adjacent reference lines are allowed as the candidate reference lines of the current block.

In another embodiment, an implicit rule is designed to indicate that, in addition to the adjacent reference line (used in the traditional prediction), whether one or more non-adjacent reference lines are allowed as the candidate reference lines of the current block. For example, the implicit rule depends on the block width, height, area, mode information from other colour components, or mode information of the neighbouring blocks. For another example, when the current block area is smaller than a pre-defined threshold, only adjacent reference line can be used to generate the intra prediction of the current block. For another example, when most of the neighbouring blocks (e.g. the top and left neighbouring blocks) are used, in additional to the adjacent reference line, non-adjacent reference lines can be used as the candidate reference line for the current block. For another example, when most of the neighbouring blocks (e.g. the top and left neighbouring blocks) are used, only non-adjacent reference lines can be used as the candidate reference line for the current block. For another example, the reference line selection of the current colour component depends on the reference line selection of other colour components.

In another embodiment, the candidate reference lines for the current block include adjacent reference line (e.g. line 0) and one or more non-adjacent reference lines.

In another embodiment, the candidate reference lines for the current block only include one or more non-adjacent reference lines.

In another embodiment, the non-adjacent reference lines refer to "only line 1 and line 2" or "only any subset of line 1 and line 2" when the current encoding/decoding component is a chroma component. That is, for chroma components (e.g. Cb, Cr), in addition to line 0, "only line 1 and line 2" or "only line 1" or "only line 2" are allowed as the candidate reference lines for the current block.

In the following, the current block is coded with one or more LM modes. For example, LM modes include one or more CCLM modes and/or one or more MMLM modes. For another example, LM modes in this invention, can "be changed to" or "further include" any mode which uses cross-component information to predict the current component. For another example, LM modes can refer to any extensions/variations from CCLM and/or MMLM modes. The variations of CCLM here mean that some optional modes can be selected when the block indication refers to using one of cross-component modes (e.g. CCLM_LT, MMLM_LT, CCLM_L, CCLM_T, MMLM_L, MMLM_T, and/or an intra prediction mode, which is not one of traditional DC, planar, and angular modes) for the current block. The following shows an example of being convolutional cross-component mode (CCCM) as an optional mode. When this optional mode is applied to the current block, cross-component information with a model, including non-linear term, is used to generate the chroma prediction. The model parameters are generated using neighbouring or current luma/chroma reconstructed or predicted blocks and the pre-defined regression-based method. The optional mode may follow the template selection of CCLM, so CCCM family includes CCCM_LT CCCM_L, and/or CCCM_T.

In another embodiment, the proposed methods are applied to chroma blocks.

In one sub-embodiment, the chroma block refers to a chroma CB belonging to a CU (including luma and chroma CBs). For example, the chroma block is in the inter slice/tile. For another example, the chroma block is split from single tree splitting.

In another sub-embodiment, the chroma block refers to a chroma CB belonging to a CU (including only chroma CBs). For example, the chroma block is in the intra slice/tile. For another example, the chroma block is split from dual tree splitting.

In another embodiment, in addition to allowing multiple candidate reference lines for LM modes, one or more than one reference lines are selected from multiple candidate reference lines when the current block is coded with an intra prediction mode (such as DIMD chroma mode, chroma DM, an intra chroma mode in the candidate list for chroma MRL, DC, planar, or angular modes, or selected mode from 67 intra prediction modes, or a mode from extended 67 intra prediction modes such as 131 intra prediction modes).

In another embodiment, the candidate list for chroma MRL includes planar, vertical, horizontal, DC, LM modes, chroma DM, DIMD chroma mode, diagonal (DIA), VDIA (mode 66 in 67 intra prediction modes) or any subset of the above. For example, the candidate list for chroma MRL includes planar (changed to VDIA if duplicated with chroma DM), vertical (changed to VDIA if duplicated with chroma DM), horizontal (changed to VDIA if duplicated with chroma DM), DC (changed to VDIA if duplicated with chroma DM), 6 LM modes (i.e. CCLM_TL, CCLM_T, CCLM_L, MMLM_TL, MMLM_T and MMLM_L), chroma DM. For another example, the candidate list for chroma MRL includes planar (changed to VDIA if duplicated with chroma DM), vertical (changed to VDIA if duplicated with chroma DM), horizontal (changed to VDIA if duplicated with chroma DM), DC (changed to VDIA if duplicated with chroma DM), chroma DM. For another example, the candidate list for chroma MRL includes 6 LM modes, chroma DM.

In another embodiment, when referencing neighbouring samples to generate intra prediction, only one reference line is used.

In one sub-embodiment, the reference line is selected from multiple candidate reference lines.

In another embodiment, when referencing neighbouring samples to generate intra prediction, only one or more than one reference lines are used.

In one sub-embodiment, either using only one reference line or using multiple reference lines depends on an implicit rule.

- For example, the implicit rule depends on block width, block height, or block area.
  - In one possible way, when the block area, block width, or block height is smaller than a predefined threshold, only one reference line is used for generating intra prediction.
    - The threshold can be any positive integer such as 2, 4, 8, 16, 32, 64, 128, 256, 512, 1024, . . . or the maximum transform size.
- For another example, the implicit rule depends on the mode information of the current block such as the intra prediction mode for the current block.
  - In one possible way, when the current intra prediction mode may have non-integer predicted samples (referring to the samples located at non-integer position), more than one reference lines are used for generating intra prediction.
  - In another way, when the current intra prediction mode may need intra interpolation filter to generate intra prediction since one or more predicted samples may fall into a fractional or integer position between reference samples according to a selected direction (by the current intra prediction mode).
- For another example, the implicit rule depends on the mode information of the previous coded blocks such as the intra prediction mode for the neighbouring block, the selected reference line for the neighbouring block.

In another sub-embodiment, either using only one reference line or using multiple reference lines depends on an explicit syntax.

In another embodiment, when referencing neighbouring samples to generate intra prediction, more than one reference line is used.

In another embodiment, when more than one reference line is used to generate intra prediction for the current block, a blending MRL is designed.

Figure 11:
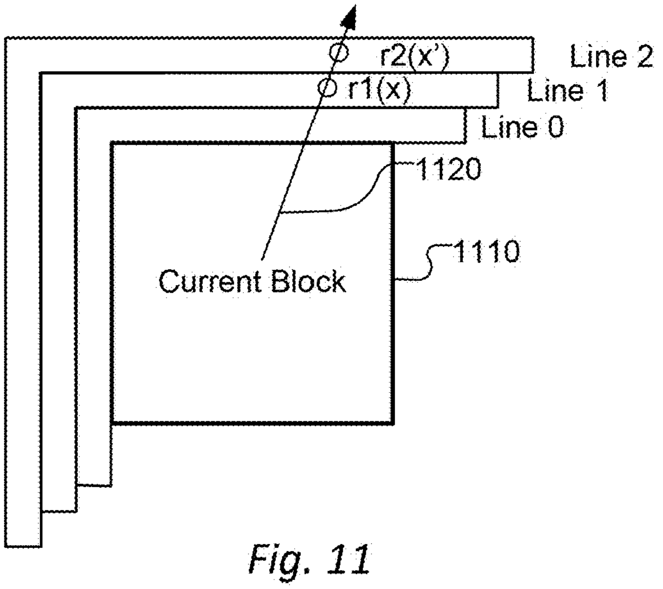
FIG. 11 illustrates an example of blending, where, when the intra prediction mode is an angular mode, the location (x) of to-be-blended sample (r1) in one reference line and the corresponding location (x') of to-be-blended sample (r2) in another reference line depend on the intra prediction mode.

- First version of blending MRL can be as follows. Each used reference line generates prediction and then a blending process is applied to blend multiple hypotheses of prediction from each used reference line.
- Second version of blending MRL can be as follows. A blending process is applied to blend each used reference line and the blended reference line is used to generate intra prediction.
  - In one way, when blending the reference lines, the intra prediction mode is considered. When the intra prediction mode is an angular mode (e.g. arrow 1120 as shown in FIG. 11) for the current block 1110, the location (x) of to-be-blended sample (r1) in one reference line and the corresponding location (x') of to-be-blended sample (r2) in another reference line depend on the intra prediction mode. When the intra prediction mode is not an angular mode such as DC or planar, the location (x) of to-be-blended sample (r1) in one reference line and the corresponding location (x') of to-be-blended sample (r2) in another reference line are the same or follow the direction of the intra prediction mode.
  - In another way, when blending the reference lines, the intra prediction mode is not considered. When the intra prediction mode is an angular mode, the location (x) of to-be-blended sample (r1) in one reference line and the corresponding location (x') of to-be-blended sample (r2) in another reference line are the same.

In the following examples/embodiments, take the first version of blending MRL and two used reference lines as examples. The final prediction for the current block is formed by weighted averaging the prediction from the first reference line and the prediction from the second reference line. (Note that the proposed methods can be applied to the second version of blending MRL. When the second version is applied and two reference lines are used for generating prediction, the final prediction for the current block is formed by the prediction from the weighted averaging of the first reference line and the second reference line and the following examples/embodiments may need some modifications accordingly.)

In one sub-embodiment, when the proposed blending process is applied, fusion of chroma intra prediction modes is disabled. (inferred as disabled)

In another sub-embodiment, when fusion of chroma intra prediction modes is applied, the proposed blending process is disabled. (inferred as disabled)

In another sub-embodiment, the weighting is predefined with an implicit rule.

- For example, the weighting is fixed as (w1, w2)=any one of (3, 1), (3, 1), (2, 2) where w1 is the weight for the first reference line and w2 is the weight for the second reference line. Since the summation of w1 and w2 is 4, right shifting by 2 is applied after adding the predicted samples from the first and second reference lines. (If second version of blending MRL is applied, right shifting by 2 is applied after adding the first and second reference lines.)
- For another example, the implicit rule depends on the current block width, height, area, the mode information or width or height of the neighbouring blocks.

In another sub-embodiment, the weighting is indicated with an explicit syntax.

In another sub-embodiment, an index is signalled to indicate the selected combination for the current block and a combination refers to an intra prediction mode, the first reference line, and the second reference line.

- In one possible way, the index is signalled with truncated unary codewords.
- In another possible way, the index is signalled with contexts.
- In another possible way, the mapping from the index to the selected combination depends on boundary/template matching. An exemplary process is shown as follows.
  - Step 0: The boundary/template matching cost for each candidate combination is calculated.
    - If boundary matching is used, for each candidate combination, the prediction for the current block is the blending prediction from multiple hypotheses of prediction by the first reference line (based on the intra prediction mode) and the second reference line (based on the intra prediction mode). (If second version of blending MRL is applied, for each candidate combination, the prediction for the current block is the prediction from the blended reference line for the first reference line (based on the intra prediction mode) and the second reference line (based on the intra prediction mode))
    - If template matching is used, for each candidate combination, the prediction on the template is the blending prediction from multiple hypotheses of prediction by the first reference line (based on the intra prediction mode) and the second reference line (based on the intra prediction mode). If the pair equal to line 1 and line 2 is a candidate pair and the template width and height are equal to 1, line 1 will be the reference line adjacent to the template and line 2 will be the reference line adjacent to line 1. (If second version of blending MRL is applied, for each candidate combination, the prediction for the template is the prediction from the blended reference line for the first reference line (based on the intra prediction mode) and the second reference line (based on the intra prediction mode))
  - Step 1: The signalling of each combination follows the order of the costs in Step 0. The index equal to 0 is signalled with the shortest or most efficient codewords and maps to the pair with the smallest boundary/template matching cost.
- Encoder and decoder perform Step 0 and Step 1 to get the same mapping from the signalled index to the combination.
- The number of the candidate combination for signalling can be reduced from original total candidate combinations to the first K candidate combinations with the smallest costs and the codewords for signalling the selected combination can be reduced. When K is set as 1, the selected combination can be inferred as the combination with the smallest cost without signalling the index. The following takes chroma MRL as an example.

If the candidate intra prediction modes include planar (changed to VDIA if duplicated with chroma DM), vertical (changed to VDIA if duplicated with chroma DM), horizontal (changed to VDIA if duplicated with chroma DM), DC (changed to VDIA if duplicated with chroma DM), chroma DM and 6 LM modes and the candidate reference lines include line 0, 1, 2 (with the first reference line as line n and the second reference line as line n+1), Originally, the total number of candidate combinations is 11*3.

With the proposed method, only the first K combination with the smallest costs are the candidate combinations for signalling, where K can be a positive integer such as 1, 2, 3, or 32.

In one possible way, when the boundary/template of the current block is not available, a default combination (e.g. any one of candidate intra prediction modes, any one pair from the candidate reference lines) is defined and used.

In another possible way, when the boundary/template of the current block is not available, chroma MRL is inferred as disabled.

In another sub-embodiment, the proposed signalling/method is applied when multiple reference lines (which can consist of an adjacent reference line and/or one or more non-adjacent reference lines) are used for generating intra prediction of the current block. For example, the proposed signalling/method (similar to a replacement method) will replace the original signalling/method for the intra prediction and/or reference line. For another example, the proposed signalling/method (similar to an alternative method) will depend on a syntax signalled or an implicit rule to be enabled or disabled and when the proposed signalling method is disabled, the original signalling/method for the intra prediction and/or reference line is followed.

In another sub-embodiment, the proposed signalling/method is applied when only non-adjacent reference lines are used for generating intra prediction of the current block. For example, the proposed signalling/method (similar to a replacement method) will replace the original signalling/method for the intra prediction and/or reference line. For another example, the proposed signalling/method (similar to an alternative method) will depend on a syntax signalled or an implicit rule to be enabled or disabled and when the proposed signalling method is disabled, the original signalling/method for the intra prediction and/or reference line is followed.

In another sub-embodiment, an index is signalled to indicate the selected combination for the current block and a combination refers to an intra prediction mode, the first reference line, the second reference line, and the weighting.

In one possible way, the index is signalled with truncated unary codewords.

In another possible way, the index is signalled with contexts.

In another possible way, the mapping from the index to the selected combination depends on boundary/template matching. An exemplary process is shown as follows.

Step 0: The boundary/template matching cost for each candidate combination is calculated.

If boundary matching is used, for each candidate combination, the prediction for the current block is the blending prediction from "multiple hypotheses of prediction by the first reference line (based on the intra prediction mode) and the second reference line (based on the intra prediction mode)" and the weighting.

If template matching is used, for each candidate combination, the prediction on the template is the blending prediction from "multiple hypotheses of prediction by the first reference line (based on the intra prediction mode) and the second reference line (based on the intra prediction mode)" and the weighting. If the pair equal to line 1 and line 2 is a candidate pair and the template width and height are equal to 1, line 1 will be the reference line adjacent to the template and line 2 will be the reference line adjacent to line 1.

Step 1: The signalling of each combination follows the order of the costs in Step 0. The index equal to 0 is signalled with the shortest or most efficient codewords and maps to the pair with the smallest boundary/template matching cost.

Encoder and decoder perform Step 0 and Step 1 to get the same mapping from the signalled index to the combination.

The number of the candidate combination for signalling can be reduced from original total candidate combinations to the first K candidate combinations with the smallest costs and the codewords for signalling the selected combination can be reduced. When K is set as 1, the selected combination can be inferred as the combination with the smallest cost without signalling the index. The following takes chroma MRL as an example and If the candidate intra prediction modes include planar (changed to VDIA if duplicated with chroma DM), vertical (changed to VDIA if duplicated with chroma DM), horizontal (changed to VDIA if duplicated with chroma DM), DC (changed to VDIA if duplicated with chroma DM), chroma DM and 6 LM modes, the candidate reference lines include line 0, 1, 2, and the candidate weightings (w1, w2) include (1, 3), (3, 1), (2, 2), With the proposed method, only the first K combination with the smallest costs are the candidate combinations for signalling, where K can be a positive integer such as 1, 2, 3, . . .

In one possible way, when the boundary/template of the current block is not available, a default combination (e.g. any one of candidate intra prediction modes, any one pair from the candidate reference lines, any one of candidate weightings) is defined and used.

In another possible way, when the boundary/template of the current block is not available, chroma MRL is inferred as disabled.

In another sub-embodiment, the first index is signalled to indicate the first reference line and the second index is signalled to indicate the second reference line. The signalling of the second index depending on the first reference line. For example, the total available candidate reference lines include line 0, line 1, and line 2. In one possible way, $$\text{The first reference line} = \text{the first index (ranging from 0 to 2)}$$

$$\text{The second reference line} = \text{the second index (ranging from 0 to 1)} + ((\text{the second index} >= \text{the first reference line})\,?\,1:0$$

In another sub-embodiment, the first reference line cannot be the same as the second reference line.

In another sub-embodiment, the first index is signalled to indicate the first reference line. The second reference line is inferred according to the first reference line. In other words, an index is signalled to decide a pair of the first and second reference lines. For another example, the second reference line is the reference line adjacent to the first reference line.

- In one possible way, the first reference line is line n and the second reference line is line n+1.
  - If line n+1 exceeds "the farthest reference line allowed for the current block" (such as line 2 if only line 0, 1, 2 are the candidate reference lines of the current block), the second reference line cannot be used.
- In another possible way, the first reference line is line n and the second reference line is line n−1.
  - If n is equal to 0, the second reference line cannot be used.
- In another possible way, the mapping from the index to the selected reference line pair depends on boundary/template matching. An exemplary process is shown as follows,
  - Step 0: The boundary/template matching cost for each candidate reference line pair is calculated.
    - If boundary matching is used, for each candidate pair, the prediction for the current block is the blending prediction from multiple hypotheses of prediction by the first reference line and the second reference line.
    - If template matching is used, for each candidate pair, the prediction on the template is the blending prediction from multiple hypotheses of prediction by the first reference line and the second reference line. If the pair equal to line 1 and line 2 is a candidate pair and the template width and height are equal to 1, line 1 will be the reference line adjacent to the template and line 2 will be the reference line adjacent to line 1.
  - Step 1: The signalling of each pair follows the order of the costs in Step 0. The index equal to 0 is signalled with the shortest or most efficient codewords and maps to the pair with the smallest boundary/template matching cost.
  - Encoder and decoder perform Step 0 and Step 1 to get the same mapping from the signalled index to the pair.
  - The number of the candidate pairs for signalling can be reduced from original total candidate pairs to the first K candidate pairs with the smallest costs and the codewords for signalling the selected pair can be reduced.
  - In one possible way, when the boundary/template of the current block is not available, a default reference pair (e.g. line 0 and line 2, line 0 and line 1, line 1 and line 2) is defined and used as the first reference line.
  - In another possible way, when the boundary/template of the current block is not available, a default reference line (e.g. line 0) is defined and used as the first reference line and only the first reference line is used for generating intra prediction.

In another sub-embodiment, the first reference line is implicitly derived and the second reference line depends on the explicit signalling and the first reference line. For one example, the first reference line is the inferred as line 0. For another example, the first reference line is the reference line with the smallest boundary matching cost. For another example, the first reference line is the reference line with the smallest template matching cost.

- In one possible way, when the boundary/template of the current block is not available, a default reference line (e.g. line 0) is defined and used as the first reference line.
- In another possible way, when the boundary/template of the current block is not available, a default reference line is defined and used as the first reference line and only the first reference line is used for generating intra prediction.

In another sub-embodiment, both the first reference line and the second reference line are implicitly derived.

- In one possible way, the selected reference line pair depends on boundary/template matching. An exemplary process is shown as follows,
  - Step 0: The boundary/template matching cost for each candidate reference line pair is calculated.
    - If boundary matching is used, for each candidate pair, the prediction for the current block is the blending prediction from multiple hypotheses of prediction by the first reference line and the second reference line.
    - If template matching is used, for each candidate pair, the prediction on the template is the blending prediction from multiple hypotheses of prediction by the first reference line and the second reference line. If the pair equal to line 1 and line 2 is a candidate pair and the template width and height are equal to 1, line 1 will be the reference line adjacent to the template and line 2 will be the reference line adjacent to line 1.
  - Step 1: The selected reference line pair is inferred as the pair with the smallest boundary/template matching cost.
  - Encoder and decoder perform Step 0 and Step 1 to get the selected the pair.
  - In another possible way, when the boundary/template of the current block is not available, a default reference line pair (e.g. line 0 and line 2, line 0 and line 1, line 1 and line 2) is defined and used as the first and second reference lines.
  - In another possible way, when the boundary/template of the current block is not available, a default reference line (e.g. line 0) is defined and used as the first reference line and only the first reference line is used for generating intra prediction.
  - In another possible way, for a candidate reference line pair, if the first reference line is line n, the second reference line should be line n+1.
    - If line n+1 exceeds "the farthest reference line allowed for the current block" (such as line 2), the second reference line cannot be used.
  - In another possible way, for a candidate reference line pair, if the first reference line is line n, the second reference line is line n−1.
    - If n is equal to 0, the second reference line cannot be used.

In another embodiment, when only one reference line is used to generate intra prediction for the current block, the selection of the reference line depends on an implicit rule. For example, the selected reference line (among the candidate reference lines) has the smallest boundary matching cost. For another example, the selected reference line (among the candidate reference lines) has the smallest template matching cost.

- In one possible way, when the boundary/template of the current block is not available, a default reference line (e.g. line 0) is defined and used as the first reference line.

In another embodiment, when only one reference line is used to generate the intra prediction for the current block, the selection of the reference line depends on an explicit rule.

In one sub-embodiment, an index is signalled to indicate the selected reference line for the current block.

In another sub-embodiment, an index is signalled to indicate the selected combination for the current block and a combination refers to an intra prediction mode and one or more reference lines.

In another possible way, the index is signalled with truncated unary codewords.

- In another possible way, the index is signalled with contexts.
- In another possible way, the mapping from the index to the selected combination depends on boundary/template matching. An exemplary process is shown as follows.
  - Step 0: The boundary/template matching cost for each candidate combination is calculated.
    - If boundary matching is used, for each candidate combination, the prediction for the current block is the prediction from the reference line (based on the intra prediction mode).
    - If template matching is used, for each candidate combination, the prediction on the template is the prediction from the reference line (based on the intra prediction mode). If the reference line equal to line 1 is a candidate reference line and the template width and height are equal to 1, line 1 will be the reference line adjacent to the template and line 2 will be the reference line adjacent to line 1.
  - Step 1: The signalling of each combination follows the order of the costs in Step 0. The index equal to 0 is signalled with the shortest or most efficient codewords and maps to the pair with the smallest boundary/template matching cost.
  - Encoder and decoder perform Step 0 and Step 1 to get the same mapping from the signalled index to the combination.
  - The number of the candidate combinations for signalling can be reduced from original total candidate combinations to the first K candidate combinations with the smallest costs and the codewords for signalling the selected combination can be reduced. When K is set as 1, the selected combination can be inferred as the combination with the smallest cost without signalling the index. The following takes chroma MRL as an example and
    - If the candidate intra prediction modes include planar (changed to VDIA if duplicated with chroma DM), vertical (changed to VDIA if duplicated with chroma DM), horizontal (changed to VDIA if duplicated with chroma DM), DC (changed to VDIA if duplicated with chroma DM), chroma DM and 6 LM modes and the candidate reference lines include line 0, 1, 2 or only line 1, 2,
    - Originally, the total number of candidate combinations is 11*(3 or 2).
    - With the proposed method, only the first K combination with the smallest costs are the candidate combination for signalling, where K can be a positive integer such as 1, 2, 3, or (32 or 21).
- In one possible way, when the boundary/template of the current block is not available, a default combination (e.g. any one of candidate intra prediction modes, any one candidate reference line) is defined and used.
- In another possible way, when the boundary/template of the current block is not available, chroma MRL is inferred as disabled.

In another sub-embodiment, the proposed signalling/method is applied when an adjacent reference line or a non-adjacent reference line is used for generating intra prediction of the current block. For example, the proposed signalling/method (similar to a replacement method) will replace the original signalling/method for the intra prediction and/or reference line. For another example, the proposed signalling/method (similar to an alternative method) will depend on a syntax signalled or an implicit rule to be enabled or disabled and when the proposed signalling/method is disabled, the original signalling/method for the intra prediction and/or reference line is followed.

In another sub-embodiment, the proposed signalling/method is applied when only a non-adjacent reference line is used for generating intra prediction of the current block. For example, the proposed signalling/method (similar to a replacement method) will replace the original signalling/method for the intra prediction and/or reference line. For another example, the proposed signalling/method (similar to an alternative method) will depend on a syntax signalled or an implicit rule to be enabled or disabled and when the proposed signalling/method is disabled, the original signalling/method for the intra prediction and/or reference line is followed.

In another embodiment, boundary matching cost for a candidate is calculated as follows. A boundary matching cost for a candidate mode refers to the discontinuity measurement (including top boundary matching and/or left boundary matching) between the current prediction (the predicted samples within the current block), generated from the candidate mode, and the neighbouring reconstruction (the reconstructed samples within one or more neighbouring blocks). Top boundary matching means the comparison between the current top predicted samples and the neighbouring top reconstructed samples, and left boundary matching means the comparison between the current left predicted samples and the neighbouring left reconstructed samples.

In one sub-embodiment, a pre-defined subset of the current prediction is used to calculate the boundary matching cost, n line(s) of top boundary within the current block and/or m line(s) of left boundary within the current block are used. (Moreover, n2 line(s) of top neighbouring reconstruction and/or m2 line(s) of left neighbouring reconstruction are used.)

- Here is an example of calculating a boundary matching cost. (n=2, m=2, n2=2, m2=2)

$$\text{cost} = \sum_{x=o}^{block\ width} (|a * pred_{x,0} - b * pred_{x,1} - c * reco_{x,-1}| + |d * reco_{x,-1} - e * pred_{x,0} - f * reco_{x,-2}|) + \sum_{y=o}^{block\ height} (|g * pred_{0,y} - h * pred_{1,y} - i * reco_{-1,y}| + |j * reco_{-1,y} - k * pred_{0,y} - l * reco_{-2,y}|)$$

where the weights (a, b, c, d, e, f, g, h, i, j, k, l) can any positive integers such as a=2, b=1, c=1, d=2, e=1, f=1, g=2, h=1, i=1, j=2, k=1, l=1.

Here is another example of calculating a boundary matching cost. (n=2, m=2, n2=1, m2=1)

$$\text{cost} = \sum_{x=o}^{block\ width}(|a*pred_{x,0} - b*pred_{x,1} - c*reco_{x,-1}|) + \sum_{y=o}^{block\ height}(|g*pred_{0,y} - h*pred_{1,y} - i*reco_{-1,y}|)$$

where the weights (a, b, c, g, h, i) can any positive integers such as a=2, b=1, c=1, g=2, h=1, i=1.

Here is another example of calculating a boundary matching cost. (n=1, m=1, n2=2, m2=2)

$$\text{cost} = \sum_{x=o}^{block\ width}(|d*reco_{x,-1} - e*pred_{x,0} - f*reco_{x,-2}|) + \sum_{y=o}^{block\ height}(|j*reco_{-1,y} - k*pred_{0,y} - l*reco_{-2,y}|)$$

where the weights (d, e, f, j, k, l) can any positive integers such as d=2, e=1, f=1, j=2, k=1, 1=1.

Here is another example of calculating a boundary matching cost. (n=1, m=1, n2=1, m2=1)

$$\text{cost} = \sum_{x=o}^{block\ width}|a*pred_{x,0} - c*reco_{x,-1}| + \sum_{y=o}^{block\ height}|g*pred_{0,y} - i*reco_{-1,y}|$$

where the weights (a, c, g, i) can any positive integers such as a=1, c=1, g=1, i=1.

Here is another example of calculating a boundary matching cost. (n=2, m=1, n2=2,m2=1)

$$\text{cost} = \sum_{x=o}^{block\ width}(|a*pred_{x,0} - b*pred_{x,1} - c*reco_{x,-1}| + |d*reco_{x,-1} - e*pred_{x,0} - f*reco_{x,-2}|) + \sum_{y=o}^{block\ height}(|g*pred_{0,y} - i*reco_{-1,y}|)$$

where the weights (a, b, c, d, e, f, g, i) can any positive integers such as a=2, b=1, c=1, d=2, e=1, f=1, g=1, i=1.

Here is another example of calculating a boundary matching cost. (n=1, m=2, n2=1, m2=2)

$$\text{cost} = \sum_{x=o}^{block\ width}(|a*pred_{x,0} - c*reco_{x,-1}|) + \sum_{y=o}^{block\ height}(|g*pred_{0,y} - h*pred_{1,y} - i*reco_{-1,y}| + |j*reco_{-1,y} - k*pred_{0,y} - l*reco_{-2,y}|)$$

where the weights (a, c, g, h, i, j, k, l) can any positive integers such as a=1, c=1, g=2, h=1, i=1, j=2, k=1, l=1.

The following examples for n and m can also be applied to n2 and m2. For another example, n can be any positive integer such as 1, 2, 3, 4, etc. For another example, m can be any positive integer such as 1, 2, 3, 4, etc. For another example, n and/or m vary with block width, height, or area.

One possible way is that, for a larger block (e.g. area>threshold2), m gets larger.
  - Threshold2=64, 128, or 256.
  - When area>threshold2, m is increased to 2. (Originally, m is 1.)
  - When area>threshold2, m is increased to 4. (Originally, m is 1 or 2.)

Another possible way is that, for a taller block (e.g. height>threshold2*width), m gets larger and/or n gets smaller.
  - Threshold2=1, 2, or 4.
  - When height>threshold2*width, m is increased to 2. (Originally, m is 1.)
  - When height>threshold2*width, m is increased to 4. (Originally, m is 1 or 2.)

Another possible way is that, for a larger block (e.g. area>threshold2), n gets larger.
  - Threshold2=64, 128, or 256.
  - When area>threshold2, n is increased to 2. (Originally, n is 1.)
  - When area>threshold2, n is increased to 4. (Originally, n is 1 or 2.)

Another possible way is that, for a wider block (e.g. width>threshold2*height), n gets larger and/or m gets smaller.
  - Threshold2=1, 2, or 4.
  - When width>threshold2*height, n is increased to 2. (Originally, n is 1.)
  - When width>threshold2*height, n is increased to 4. (Originally, n is 1 or 2.)

In another embodiment, template matching cost for a candidate is calculated as follows. A template matching cost for a candidate refers to the distortion (including top template matching and/or left template matching) between the template prediction (the predicted samples within the template), generated from the candidate, and the template reconstruction (the reconstructed samples within template). Top template matching means the distortion between the top template predicted samples and the top template reconstructed samples, and left template matching means the distortion between the left template predicted samples and the left template reconstructed samples. The distortion can be SAD, SATD, or any measurement matrix/methods for difference.

Method 1: Linear Model Based on Multiple Reference Lines

Figure 12:
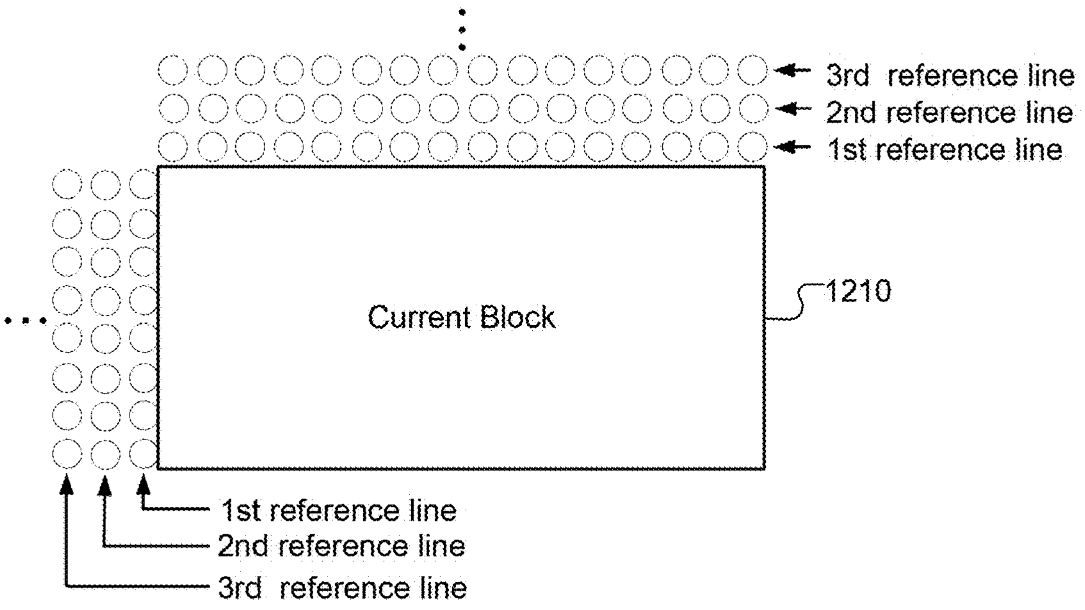
FIG. 12 illustrates an example of linear model based on multiple reference lines for deriving model parameters in CCLM/MMLM.

If chroma component or luma component of the current block has multiple neighbouring reference lines (including the adjacent reference line and/or non-adjacent reference lines), as shown in FIG. 12 for a current block 1210, the neighbouring samples for deriving model parameters in CCLM/MMLM can be adaptive by reference line selection. In one embodiment, if the current block has N neighbouring reference lines, the i-th neighbouring reference line is selected for deriving model parameters in CCLM/MMLM, where N>1 and N≥i≥1. In another embodiment, if the current block has N neighbouring reference lines, more than one reference lines are selected for deriving model parameters in CCLM/MMLM. For example, if the current block has N neighbouring reference lines, it can choose 2 out of N, 3 out of N, . . . , or 3 out of N neighbouring reference lines for deriving model parameters. The selected neighbouring reference lines can be non-adjacent neighbouring reference lines. For example, if 2 out of N neighbouring reference lines are selected, these 2 lines can be the $1^{st}$ and $3^{rd}$ reference lines, $2^{nd}$ and $4^{th}$ reference lines, $1^{st}$ and $4^{th}$ reference lines, . . . , and so on.

Figure 13:
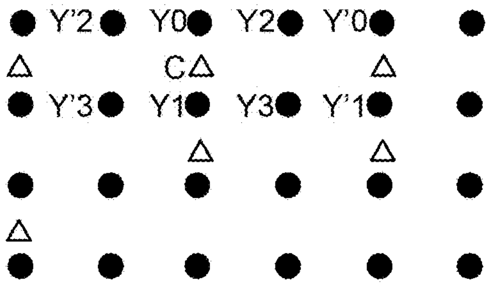
FIG. 13 illustrates an example of using luma reference line samples without luma down-sampling process to derive model parameters.

Besides, if a chroma neighbouring reference line is selected, it can select another luma reference line, which does not require to be the corresponding luma reference line. For example, if the i-th chroma neighbouring reference line is selected, it can choose the j-th luma neighbouring reference line, where i and j can be different or the same. Moreover, it can also use luma reference line samples without luma down-sampling process to derive model parameters. For example, as shown in FIG. 13, if the corresponding luma samples associated with one chroma sample are Y0, Y1, Y2, Y3, it can choose every Y0, Y1, (Y0+Y2+1)>>1, (Y'2+(Y0<<1)+Y2+2)>>2, (Y0+(Y2<<1)+Y'0+2)>>2, or (Y0+Y2−Y'2) samples at a specified neighbouring luma line to derived model parameters. For another example, it can choose every Y1, Y3, (Y1+Y3+1)>>1, (Y'3+(Y1<<1)+Y3+2)>>2, (Y1+(Y3<<1)+Y'1+2)>>2, or (Y1+Y3−Y'3) samples at a specified neighbouring luma line to derived model parameters.

In still another embodiment, if more than one neighbouring reference line CCLM/MMLM is used, the luma down-sampling filters between each reference line can be different. For example, if two reference lines used in CCLM/MMLM, the down-sampling filter to output the selected line closest to the current block boundary can be an m-tap high-pass or low-pass filter. The down-sampling filter to output the other line can be an n-tap high-pass or low-pass filter. In still another embodiment, m is 6, and nis 4. In still another embodiment, m is greater than n. In still another embodiment, m is less than n.

Moreover, if a line of multiple reference lines is invalid due to the neighbouring samples not available or due to CTU row buffer size constraints, another valid reference line is used to replace the invalid reference line. For example, as the three lines shown in FIG. 14, if the $3^{rd}$ reference line is invalid but the $1^{st}$ and the $2^{nd}$ reference lines are valid, it can use the $1^{st}$ or the $2^{nd}$ reference line to replace the $3^{rd}$ reference line. In still another embodiment, only the valid reference line is used in cross component model derivation. In other words, the invalid reference line is not used in cross component model derivation.

Method 2: Mode Derivation for Linear Model Based on Multiple Reference Lines

Figure 14A:
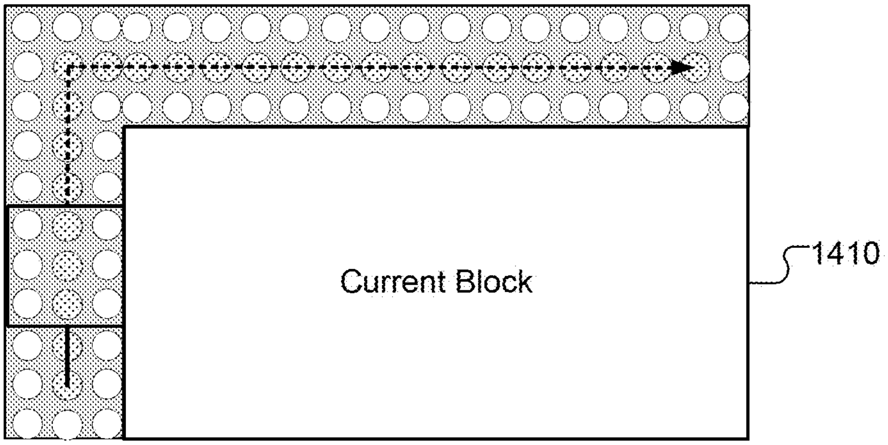
FIG. 14A illustrates an example of combining multiple neighbouring reference lines to derive cross component model parameters.
Figure 14B:
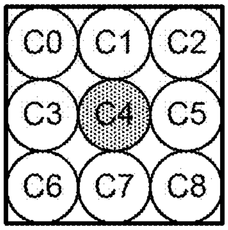
FIG. 14B illustrates an example of combining reference lines using a 3×3 window.
Figure 14C:
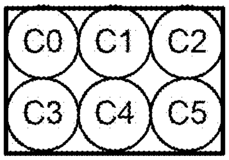
FIG. 14C illustrates an example of combining reference lines using a 3×2 window.

If chroma component or luma component of the current block has multiple neighbouring reference lines, it can combine or fuse multiple neighbouring reference lines into one line to derive model parameters in CCLM/MMLM. In one embodiment, as shown in FIG. 14A, if three neighbouring reference lines are available for the current block 1410, it can use a 3×3 window (FIG. 14B) to combine the three neighbouring reference lines into one line and use the combined line to derive cross component model parameters. The combined result of a 3×3 window is formulated as $$\left(\sum_{i=0}^{8} w_i \times C_i + b\right),$$

where $w_i$ can be a positive or negative value or 0, b is an offset value. Similarly, as still the same example, it can use a 3×2 window in FIG. 14C to combine three the neighbouring reference lines first. The combined result at a 3×2 window is formulated as $$\left(\sum_{i=0}^{5} W_i \times C_i + b\right),$$

where $w_i$ can be a positive or negative value, b is an offset value. Note, the $C_i$ can be neighbouring luma or chroma samples. In still another embodiment, a generalized formula is $$\left(\sum_{i=0}^{S} w_i \times L_i + \sum_{i=0}^{S} w_i \times C_i + b\right),$$

where $L_i$ and $C_i$ are the neighbouring luma and chroma samples, S is the applied window size, $w_i$ can be a positive or negative value or 0, b is an offset value.

Method 3: Mode Derivation for CCLM/MMLM Based on Multiple Reference Lines

If the model derivation of CCLM/MMLM is based on different neighbouring reference lines selection, the indication of the selected lines of CCLM/MMLM can be explicitly determined or implicitly derived. For example, if one or two reference lines are allowed for the current block, and the selected line(s) of CCLM/MMLM is explicitly determined, a first bin is used to indicate if one line or two lines are used. Then, a second bin or more bins (coded by truncate unary or fix length code) are used to indicate which reference line or what lines combination is selected. For example, if one reference line is used, it can choose from {$1^{st}$ line, $2^{nd}$ line, $3^{rd}$ line . . . }. If two reference lines are used, it can choose from {$1^{st}$ line+$2^{nd}$ line, $2^{nd}$ line+$3^{rd}$ line, $1^{st}$ line+$3^{rd}$ line . . . }.

The selected lines of CCLM/MMLM can be implicitly derived by using decoder side tools, such as by the template cost or boundary matching. For example, at decoder side, the final line selection of the current block is the CCLM/MMLM with the line(s) that can minimize the difference of the boundary samples of the current block and the neighbouring samples along the boundary, as shown in FIG. 15.

Figure 15:
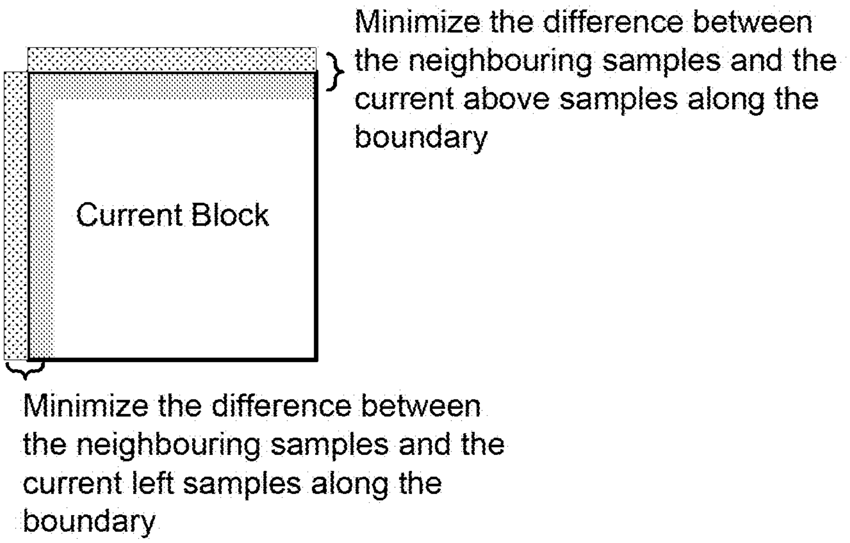
FIG. 15 illustrates an example of implicitly determining reference line selection based on boundary match cost.

At the decoder side, the final line selection of the current block is the CCLM/MMLM with the line(s) that can minimize the distortion of neighbouring templates (e.g., the dot-filled area in FIG. 15). For example, after deriving model parameters of a CCLM/MMLM by a certain line, the model is applied to the luma samples of the neighbouring templates, and the cost is calculated. Then, it goes to derive model parameters of a CCLM/MMLM by another line, the model is applied to the luma samples of the neighbouring templates and the current cost is compared with the cost by earlier models. This process is continuously applied to other models, and the final chroma prediction of the current block is selected according to the model that has the minimal cost.

Besides, the usage of more than one reference line can depend on the current block size or the mode of CCLM/MMLM. In one embodiment, if the current block width is smaller than a threshold, then more than one reference line is used in CCLM_A or MMLM_A. Similarly, if the current block height is smaller than a threshold, then more than one reference line is used in CCLM_L or MMLM_L. If the (width+height) of the current block is smaller than a threshold, then more than one reference line is used in CCLM_LA or MMLM_LA. For still another example, if the area of the current block is smaller than a threshold, then more than two reference lines are used in CCLM or MMLM. In another embodiment, more than one reference line is used in CCLM_A, CCLM_L, MMLM_A, or MMLM_L. In still another embodiment, a syntax is signalled at SPS (Sequence Parameter Set), PPS (Picture Parameter Set), PH (Picture Header), SH (Slice Header), CTU, CU, or PU level to indicate if more than one reference line is allowed for the current block.

The proposed methods in this invention can be enabled and/or disabled according to implicit rules (e.g. block width, height, or area) or according to explicit rules (e.g. syntax on block, tile, slice, picture, SPS, or PPS level). For example, the proposed reordering is applied when the block area is smaller than a threshold.

The term "block" in this invention can refer to TU/TB, CU/CB, PU/PB, pre-defined region, or CTU/CTB. The CU with the proposed method can refer to an intra block coded by an intra coding mode, the CU with the proposed method can refer to an inter block coded by an inter coding mode, and/or the CU with the proposed method can refer to an IBC block coded by IBC coding mode using block vectors (which are decided by syntax elements or implicit searching algorithm of template matching at encoder/decoder) to refer the reference block in the current picture. For example, the inter coding mode is an inter merge mode with the prediction being generated by a combination of prediction from inter and prediction from intra with the proposed method or the inter coding mode is an inter merge mode with the chroma prediction being generated by prediction from intra with the proposed method. For another example, the IBC coding mode is an IBC submode with the prediction being generated by combination of prediction from block vectors and prediction from intra with the proposed method or the IBC coding mode is an IBC submode with the chroma prediction being generated by prediction from intra with the proposed method.

Any combination of the proposed methods in this invention can be applied.

Figure 1A:
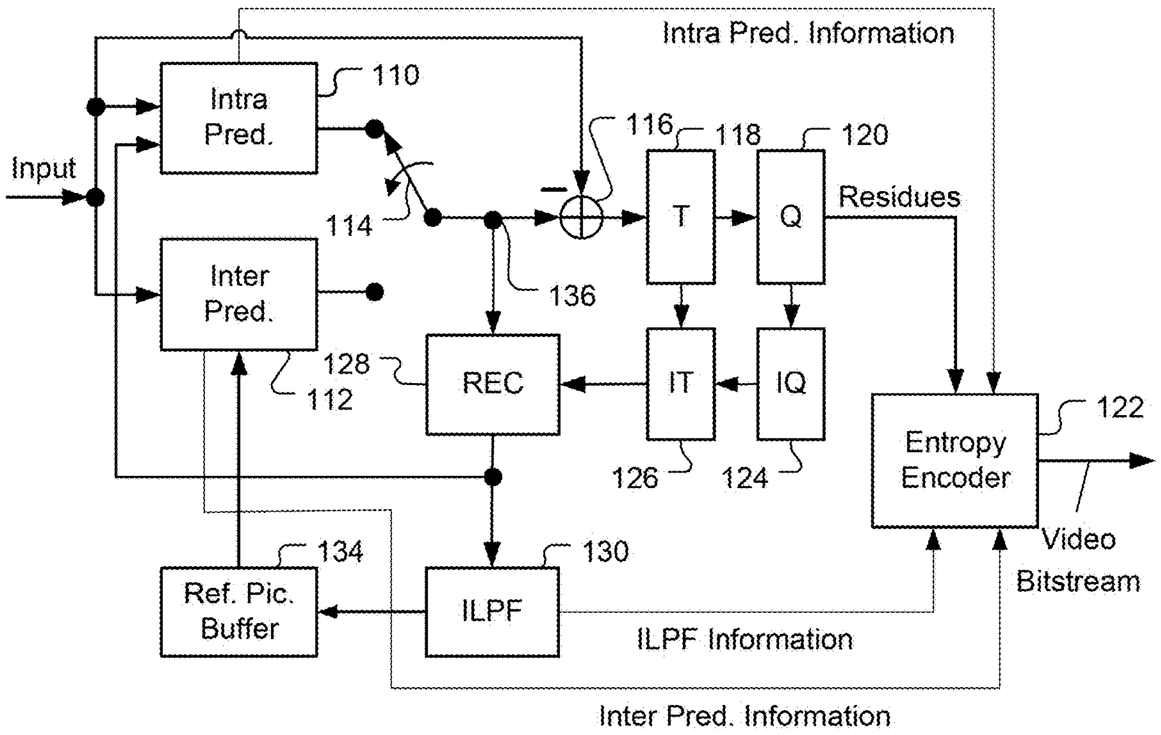
FIG. 1A illustrates an exemplary adaptive Inter/Intra video coding system incorporating loop processing.
Figure 1B:
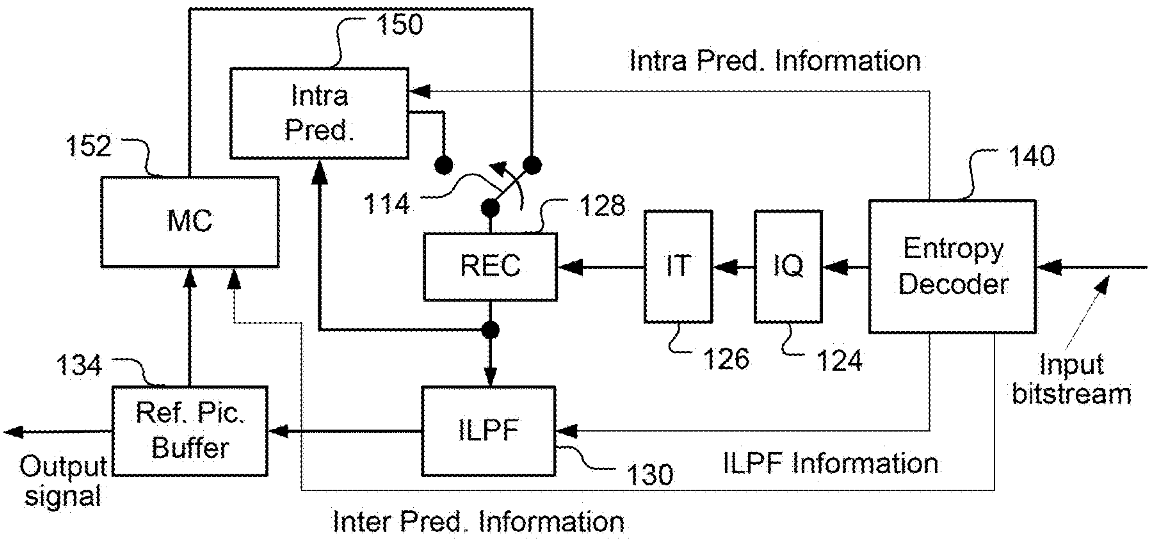
FIG. 1B illustrates a corresponding decoder for the encoder in FIG. 1A.
Figure 2:
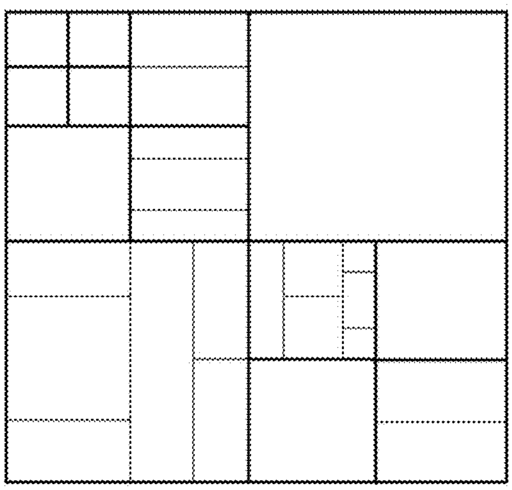
FIG. 2 shows an example of a CTU divided into multiple CUs with a quadtree and nested multi-type tree coding block structure, where the bold block edges represent quadtree partitioning and the remaining edges represent multi-type tree partitioning.
Figure 3:
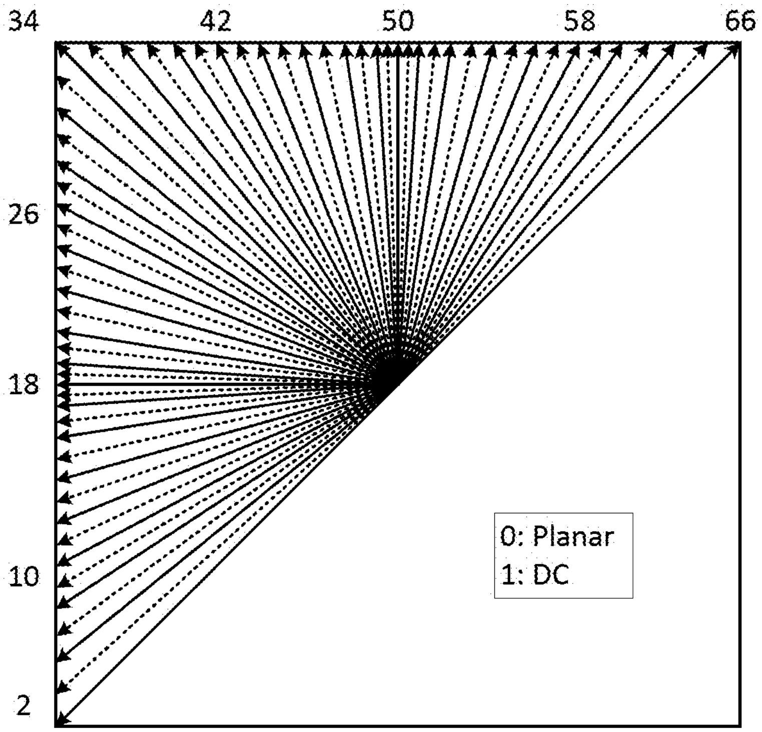
FIG. 3 shows the intra prediction modes as adopted by the VVC video coding standard.
Figure 4A:
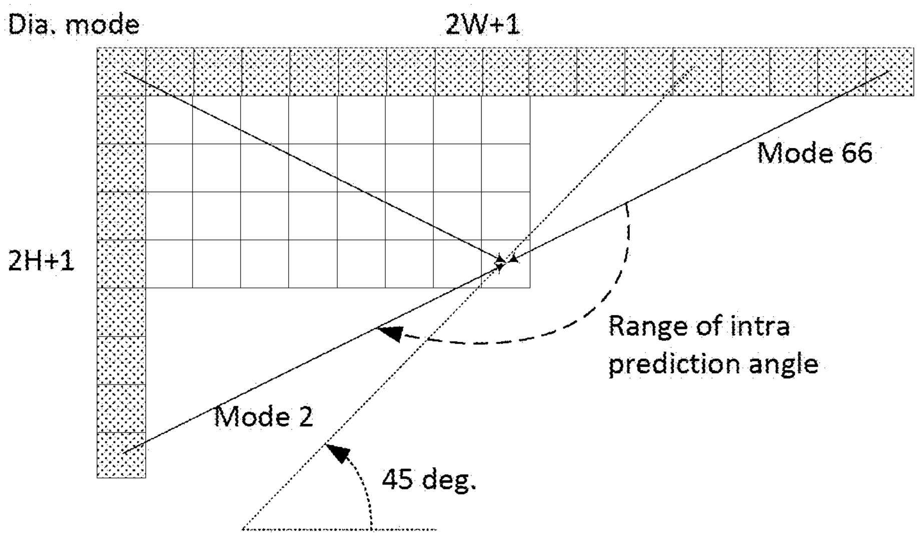
FIG. 4A-B illustrate examples of wide-angle intra prediction a block with width larger than height (FIG. 4A) and a block with height larger than width (FIG. 4B).
Figure 4B:
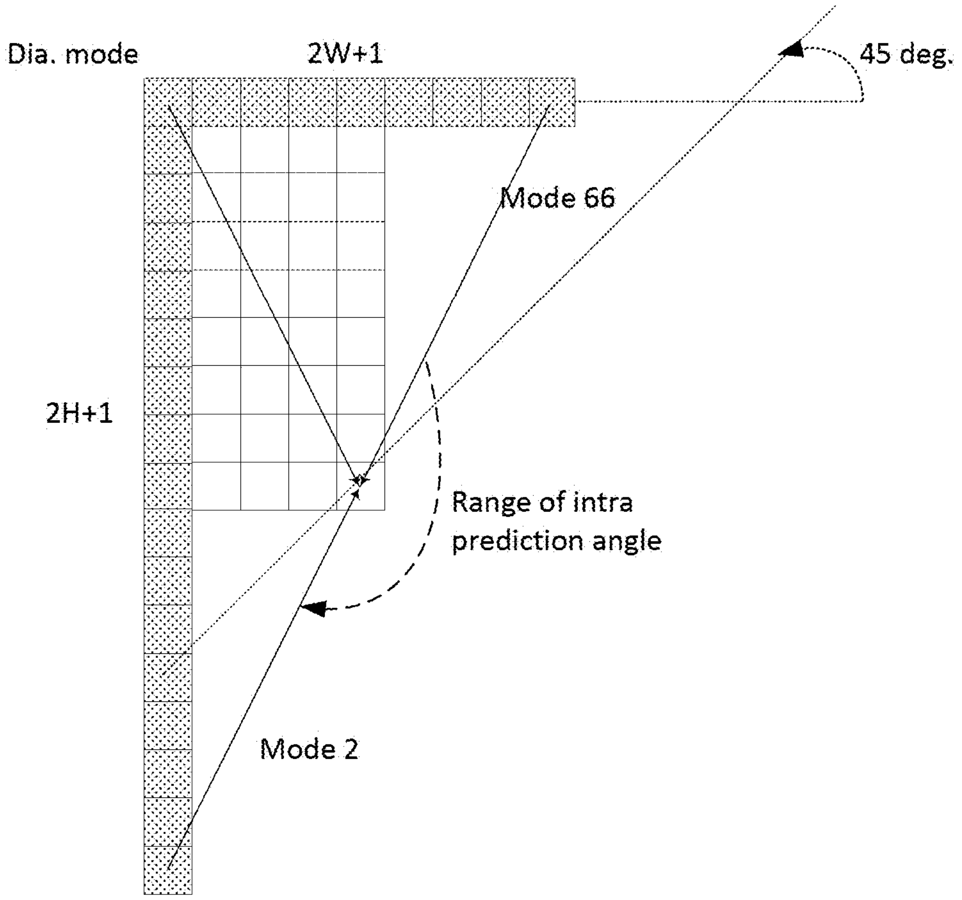
Figure 5:
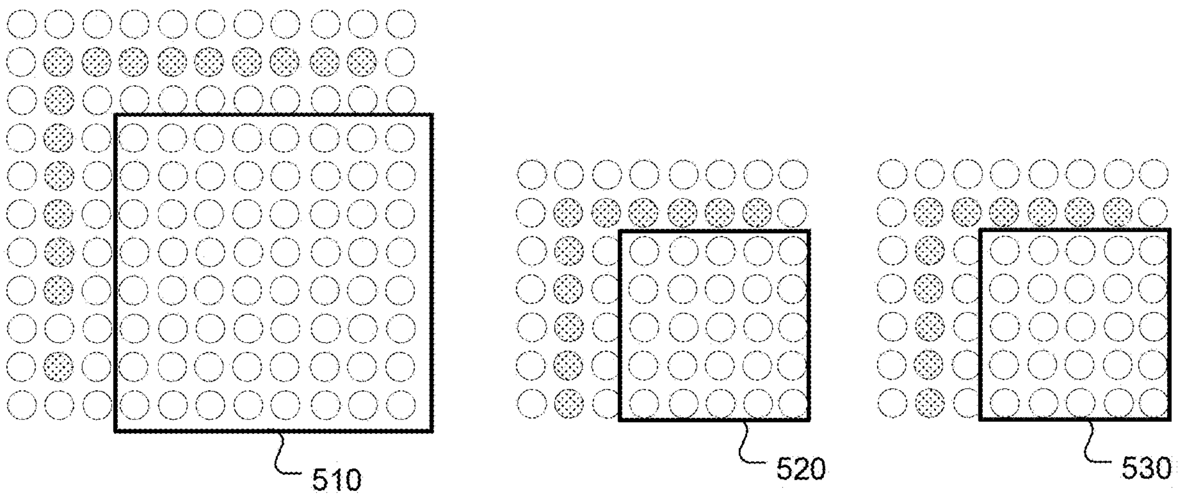
FIG. 5 illustrates neighbouring reconstructed Y, Cb and Cr samples used to derive the gradient for DIMD.
Figure 6:
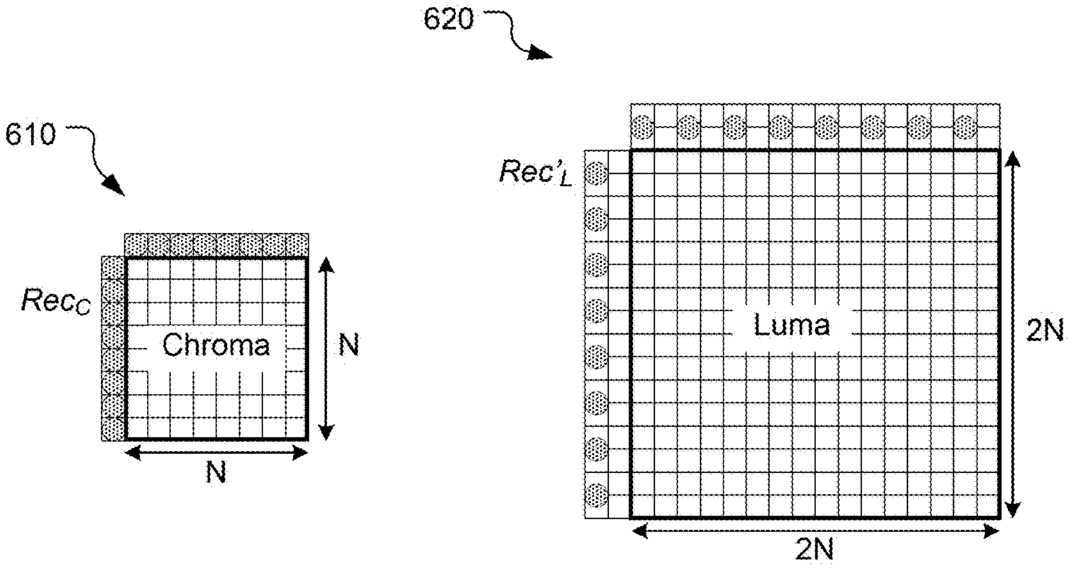
FIG. 6 shows an example of the location of the left and above samples and the sample of the current block involved in the LM_LA mode.
Figure 7:
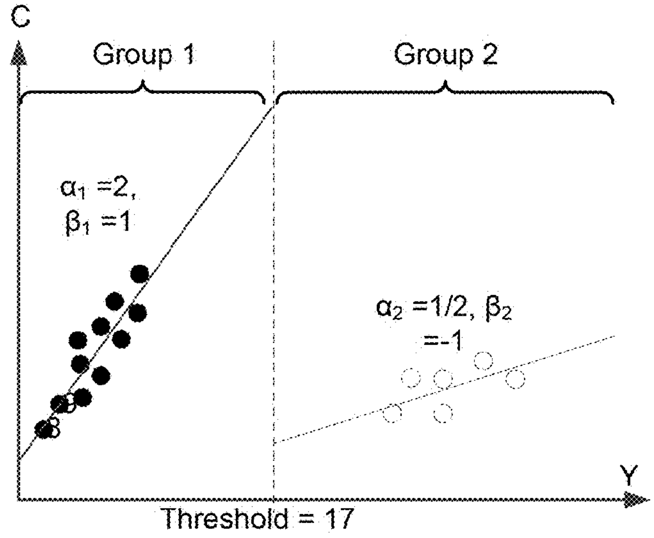
FIG. 7 shows an example of classifying the neighbouring samples into two groups according to multiple mode CCLM.
Figure 8:
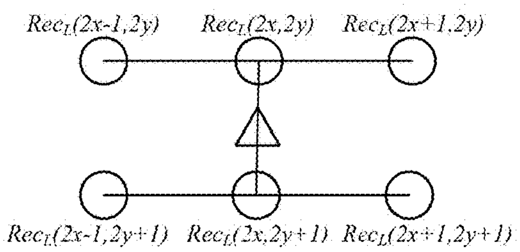
FIG. 8 illustrates an example of luma sample down-sampling for self-aware filter estimation (SAFE)-CCLM for 4:2:0 colour format.
Figure 9:
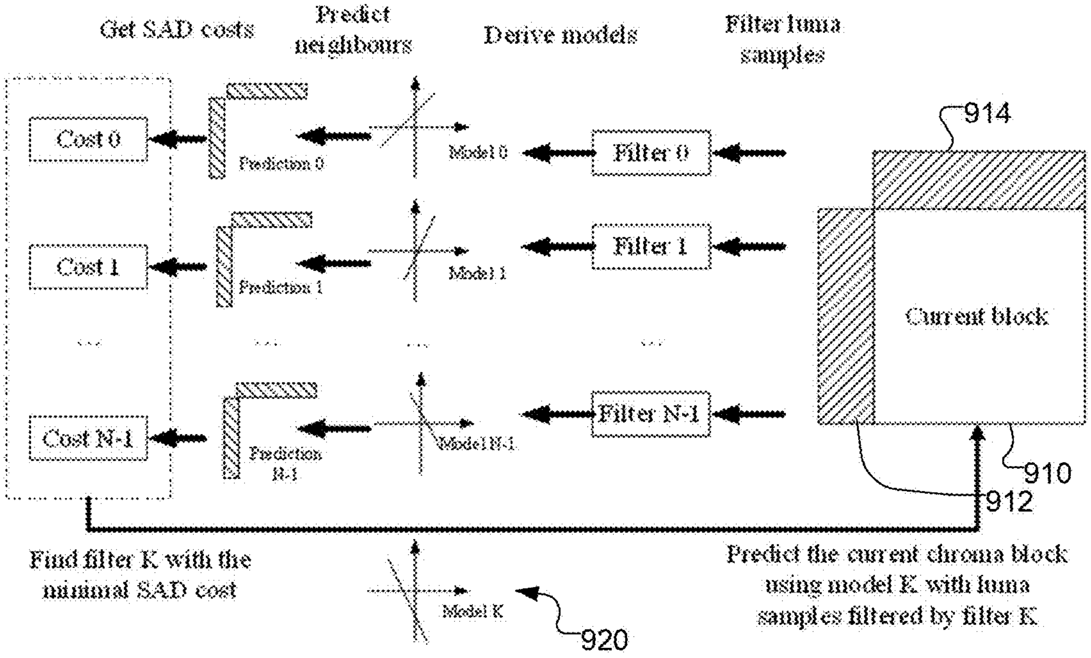
FIG. 9 illustrates a flowchart of self-aware filter estimation (SAFE)-CCLM.

The joint prediction by combining an intra prediction mode and one or more reference lines as described above can be implemented in an encoder side or a decoder side. For example, any of the proposed methods to evaluate costs associated a set of intra prediction candidates using one or more reference lines can be implemented in an Intra coding module (e.g. Intra pred. 150 in FIG. 1B) in a decoder or an Intra coding module is an encoder (e.g. Intra Pred. 110 in FIG. 1A). Any of the proposed methods can also be implemented as a circuit coupled to the intra coding module at the decoder or the encoder. However, the decoder or encoder may also use additional processing unit to implement the required processing. While the Intra Pred, units (e.g. unit 110 in FIG. 1A and unit 150 in FIG. 1B) are shown as individual processing units, they may correspond to executable software or firmware codes stored on a media, such as hard disk or flash memory, for a CPU (Central Processing Unit) or programmable devices (e.g. DSP (Digital Signal Processor) or FPGA (Field Programmable Gate Array)).

Figure 16:
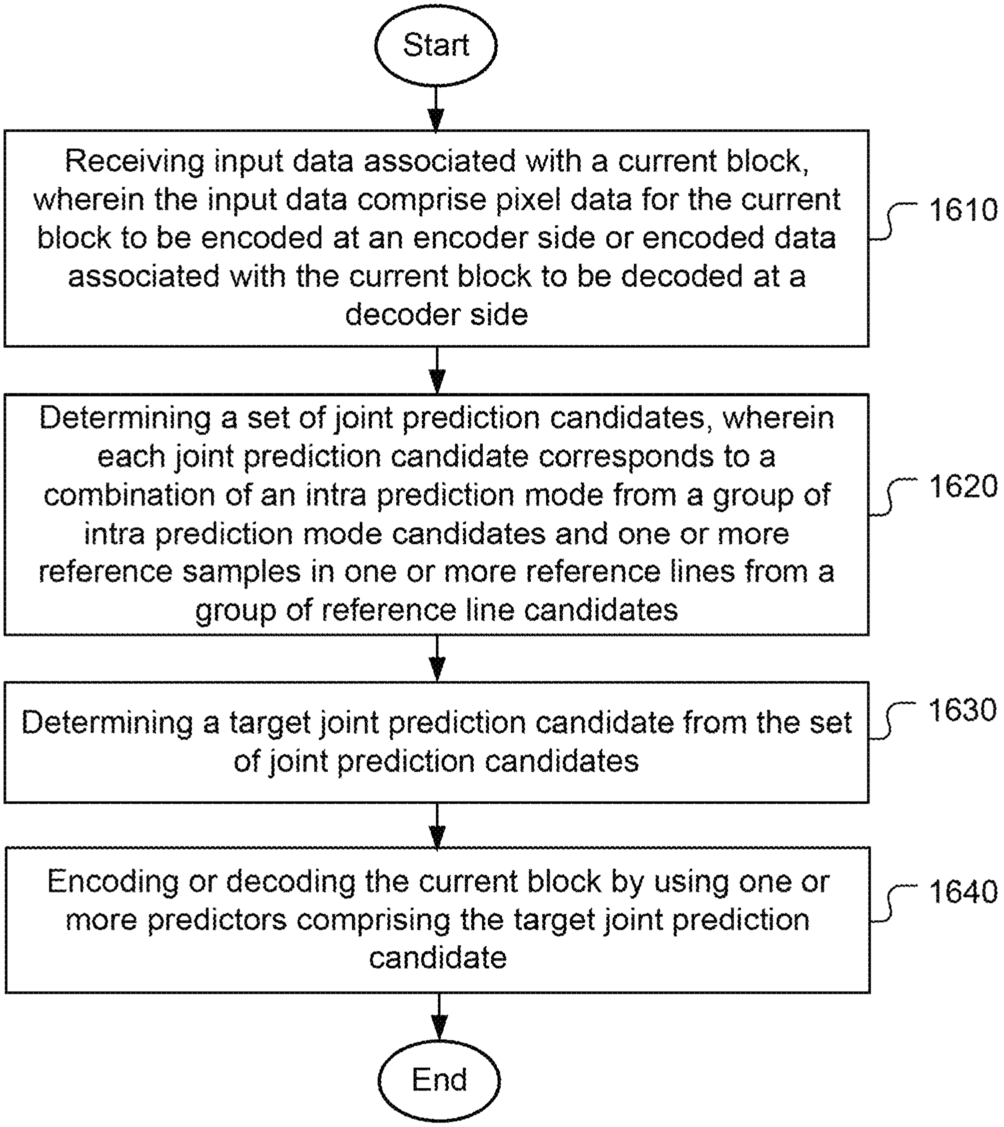
FIG. 16 illustrates a flowchart of an exemplary video coding system that incorporates joint prediction by combining an intra prediction mode and one or more reference lines according to an embodiment of the present invention.

FIG. 16 illustrates a flowchart of an exemplary video coding system that incorporates joint prediction by combining an intra prediction mode and one or more reference lines according to an embodiment of the present invention. The steps shown in the flowchart may be implemented as program codes executable on one or more processors (e.g., one or more CPUs) at the encoder side. The steps shown in the flowchart may also be implemented based hardware such as one or more electronic devices or processors arranged to perform the steps in the flowchart. According to the method, input data associated with a current block are received in step 1610, wherein the input data comprise pixel data for the current block to be encoded at an encoder side or encoded data associated with the current block to be decoded at a decoder side. A set of joint prediction candidates are determined in step 1620, wherein each joint prediction candidate corresponds to a combination of an intra prediction mode from a group of intra prediction mode candidates and one or more reference samples in one or more reference lines from a group of reference line candidates. A target joint prediction candidate is determined from the set of joint prediction candidates in step 1630. The current block is encoded or decoded by using one or more predictors comprising the target joint prediction candidate in step 1640.

The flowchart shown is intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of video coding, the method comprising:

receiving input data associated with a current block, wherein the input data comprise pixel data for the current block to be encoded at an encoder side or encoded data associated with the current block to be decoded at a decoder side;

determining a set of joint prediction candidates, wherein each joint prediction candidate corresponds to a combination of an intra prediction mode from a group of intra prediction mode candidates and one or more reference samples in one or more reference lines from a group of reference line candidates;

determining a target joint prediction candidate from the set of joint prediction candidates; and encoding or decoding the current block by using one or more predictors comprising the target joint prediction candidate, wherein a set of indexes are mapped to the set of joint prediction candidates according to cost measurement associated with members of the set of joint prediction candidates, and a shortest codeword is assigned to a target index with a smallest cost measurement.

2. The method of claim 1, wherein said one or more reference samples comprise one or more predicted samples or one or more reconstructed samples in one or more non-adjacent neighbouring lines of the current block.

3. The method of claim 2, wherein said one or more reference samples further comprise one or more predicted samples or one or more reconstructed samples in an adjacent neighbouring line of the current block.

4. The method of claim 1, wherein an index indicating the target joint prediction candidate from the set of joint prediction candidates is signalled at the encoder side or parsed at the decoder side.

5. The method of claim 1, wherein the cost measurement corresponds to boundary matching cost or template matching cost for members of the set of joint prediction candidates.

6. The method of claim 1, wherein the set of joint prediction candidates are reordered according to the cost measurement.

7. The method of claim 1, wherein a target index indicating the target joint prediction candidate from the set of joint prediction candidates for the current block is signalled at the encoder side or parsed at the decoder side.

8. The method of claim 1, wherein first K joint prediction candidates with smallest cost measurement are mapped to the set of indexes, and K is a positive integer.

9. The method of claim 1, wherein the group of intra prediction mode candidates comprise all available intra prediction modes or a subset of said all available intra prediction modes.

10. The method of claim 1, wherein the group of intra prediction mode candidates, the group of reference line candidates, or both are determined according to block size of the current block.

11. The method of claim 1, wherein the target joint prediction candidate is used to replace original intra prediction.

12. The method of claim 11, wherein whether the target joint prediction candidate is used to replace the original intra prediction is enabled or disabled depending on a signalled syntax or is determined implicitly.

13. The method of claim 1, wherein final intra prediction is selected between the target joint prediction candidate and original intra prediction.

14. The method of claim 13, wherein whether the target joint prediction candidate is used to replace the original intra prediction is enabled or disable depending on a signalled syntax or is determined implicitly.

15. The method of claim 1, wherein the target joint prediction candidate is used to encode or decode a chroma block of the current block, and the group of intra prediction mode candidates for chroma MRL (multiple reference lines) prediction comprise planar, vertical, horizontal, DC, one or more LM modes, chroma DM, DIMD chroma mode, diagonal (DIA), VDIA (mode 66 in 67 intra prediction modes), or any combination thereof.

16. The method of claim 1, wherein said one or more reference samples are used for assisting determining the target joint prediction candidate.

17. A method of video coding, the method comprising:

receiving input data associated with a current block, wherein the input data comprise pixel data for the current block to be encoded at an encoder side or encoded data associated with the current block to be decoded at a decoder side;

determining a set of joint prediction candidates, wherein each joint prediction candidate corresponds to a combination of an intra prediction mode from a group of intra prediction mode candidates and one or more reference samples in one or more reference lines from a group of reference line candidates;

determining a target joint prediction candidate from the set of joint prediction candidates; and encoding or decoding the current block by using one or more predictors comprising the target joint prediction candidate, wherein a set of indexes are mapped to the set of joint prediction candidates according to cost measurement associated with members of the set of joint prediction candidates, wherein when the K is equal to 1, a target index indicating the target joint prediction candidate from the set of joint prediction candidates for the current block is not signalled at the encoder side or the target index is inferred at the decoder side.

18. An apparatus for video coding, the apparatus comprising one or more electronics or processors arranged to:

receive input data associated with a current block, wherein the input data comprise pixel data for the current block to be encoded at an encoder side or encoded data associated with the current block to be decoded at a decoder side;

determine a set of joint prediction candidates, wherein each joint prediction candidate corresponds to a combination of an intra prediction mode from a group of intra prediction mode candidates and one or more reference samples in one or more reference lines from a group of reference line candidates;

determine a target joint prediction candidate from the set of joint prediction candidates; and encode or decode the current block by using one or more predictors comprising the target joint prediction candidate, wherein a set of indexes are mapped to the set of joint prediction candidates according to cost measurement associated with members of the set of joint prediction candidates, and a shortest codeword is assigned to a target index with a smallest cost measurement.

* * * * *